(12) United States Patent
Kankaria et al.

(10) Patent No.: US 12,504,087 B2
(45) Date of Patent: Dec. 23, 2025

(54) VALVE ASSEMBLY AND A METHOD OF FORMING THE VALVE ASSEMBLY

(71) Applicant: EATON INTELLIGENT POWER LIMITED, Dublin (IE)

(72) Inventors: Anuj Kankaria, Pune (IN); Mayur Pote, Pune (IN); Sreenivas Pai, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/252,323

(22) PCT Filed: Nov. 10, 2021

(86) PCT No.: PCT/EP2021/025436
§ 371 (c)(1),
(2) Date: May 9, 2023

(87) PCT Pub. No.: WO2022/100885
PCT Pub. Date: May 19, 2022

(65) Prior Publication Data
US 2023/0417336 A1    Dec. 28, 2023

(30) Foreign Application Priority Data

Nov. 10, 2020 (IN) ............................ 202011049061
May 11, 2021 (IN) ............................ 202111021277

(51) Int. Cl.
*F16K 24/04* (2006.01)
*B60K 15/03* (2006.01)
*B60K 15/035* (2006.01)

(52) U.S. Cl.
CPC .. *F16K 24/044* (2013.01); *B60K 2015/03289* (2013.01); *B60K 15/035* (2013.01); *Y10T 137/3099* (2015.04)

(58) Field of Classification Search
CPC ...... F16K 24/044; F16K 29/00; F16K 24/042; F16K 24/04; F16K 24/06; F16K 27/07;
(Continued)

(56) References Cited

U.S. PATENT DOCUMENTS 5,605,175 A * 2/1997 Bergsma ............... F16K 24/042
137/202
5,638,856 A    6/1997 Ohsaki
(Continued)

FOREIGN PATENT DOCUMENTS

KR       101075793 B1    10/2011
WO    WO 2018085325 A1    5/2018
WO    WO-2024189604 A2 * 9/2024 ............. B60K 15/03

OTHER PUBLICATIONS

International Search Report and Written Opinion mailed on Sep. 8, 2022 for International Application No. PCT/EP2021/025436, 14 pages.

*Primary Examiner* — Craig J Price
(74) *Attorney, Agent, or Firm* — Baker Botts L.L.P.

(57) ABSTRACT

A valve assembly is described herein. The valve assembly has a housing having first and second body portions cooperating to enclose a cavity. The first body portion includes a cap having a nozzle that extends from the cap, and the nozzle defines an outlet. The first body portion includes a seat defining an orifice in fluid communication with the outlet and the cavity. A float is disposed inside the cavity. A seal is spaced from the seat when the float is in the initial position and the seal engages the seat when the float is in the displaced position.

14 Claims, 19 Drawing Sheets

(58) Field of Classification Search
CPC ........ B60K 2015/03289; B60K 15/035; B60K
15/03519; B60K 15/03504; Y10T
137/3099; Y10T 137/053; Y10T
137/0753; Y10T 137/0777; Y10T
137/0874; Y10T 137/6004; Y10T
137/7358; Y10T 137/7423; Y10T
137/7426; Y10T 137/86324; Y10T
137/86332; F16L 47/02; F16L 47/14;
F02M 37/017; F02M 37/0076
USPC ..... 137/15.26, 38, 39, 43, 315.08, 409, 429,
137/430, 587, 588; 220/86.2, 745, 746;
141/59, 198, 202, 229; 123/516, 518,
123/198 D, 520
See application file for complete search history.

(56) References Cited

U.S. PATENT DOCUMENTS

| | | | | |
|---|---|---|---|---|
| 5,950,659 | A | 9/1999 | Szlaga | |
| 5,957,150 | A * | 9/1999 | Perkins | F16K 24/048 137/202 |
| 6,145,533 | A * | 11/2000 | Perkins | F16K 24/048 137/202 |
| 6,276,390 | B1 * | 8/2001 | Perkins | F16K 24/00 137/202 |
| 6,371,152 | B1 * | 4/2002 | Benjey | B60K 15/03519 137/202 |
| 6,779,544 | B2 * | 8/2004 | Devall | B60K 15/03519 137/202 |
| 6,848,463 | B2 * | 2/2005 | Johansen | F16K 24/044 137/202 |
| 6,863,082 | B1 * | 3/2005 | McIntosh | B60K 15/03519 137/202 |
| 8,100,153 | B2 * | 1/2012 | Hirata | F16K 31/22 141/95 |
| 8,230,873 | B2 * | 7/2012 | Martin | F16K 24/044 137/202 |
| 11,059,368 | B2 * | 7/2021 | Mensch | B60K 15/03504 |
| 11,733,718 | B2 * | 8/2023 | Mihara | B60K 15/035 137/398 |
| 2010/0282335 | A1 * | 11/2010 | Mills | F16K 24/044 137/202 |
| 2019/0255938 | A1 | 8/2019 | Mensch | |

* cited by examiner

VALVE ASSEMBLY AND A METHOD OF FORMING THE VALVE ASSEMBLY

CROSS-REFERENCE TO RELATED APPLICATIONS

The present application claims priority to, and the benefit of, Indian Patent Application No. 202011049061 filed on Nov. 10, 2020, and Indian Patent Application No. 202111021277 filed on May 11, 2021, the entire disclosures of which are incorporated by reference herein.

TECHNICAL FIELD

The present teachings generally include a valve assembly and a method of forming the valve assembly, in which the valve assembly may be used with a fuel tank in certain configurations.

BACKGROUND

Fuel tank valves that function to vent vapors from a fuel tank are known. Generally, the vapors are vented to a canister that stores the vapors and is periodically purged. Some fuel tank valves are configured to vent the fuel tank during fueling.

SUMMARY

The present teachings generally provide a valve assembly that includes a housing. The housing includes a first body portion and a second body portion attached to the first body portion. The first body portion and the second body portion cooperate to enclose a cavity. The first body portion includes a cap having a nozzle extending from the cap, and the nozzle defines an outlet. The first body portion includes a seat defining an orifice in fluid communication with the outlet and the cavity. The valve assembly also includes a float disposed inside the cavity, and the float is movable between an initial position and a displaced position. The valve assembly further includes a seal secured to the housing and the float. The seal is spaced from the seat when the float is in the initial position and the seal engages the seat when the float is in the displaced position. The cap, the nozzle, and the seat are formed together as one piece.

The present teachings also generally provide a method of forming the valve assembly. A first core and a second core are attached together to form a sub-core. The sub-core is positioned inside a mold. A first body portion of a housing is formed inside the mold to present a cap, a nozzle formed around the first core, and a seat formed around the second core. The first core is removed from the first body portion to present an outlet of the nozzle. The second core is removed from the first body portion to present an orifice of the seat. The cap, the nozzle, and the seat are formed as one piece when forming the first body portion.

In addition, the present teachings generally provide a valve assembly that includes a housing. The housing includes a first body portion and a second body portion attached to the first body portion. The first body portion and the second body portion cooperate to enclose a cavity. The first body portion includes a cap having a nozzle that extends from the cap. The nozzle defines an outlet. The first body portion includes a first side wall extending outwardly from the cap away from the nozzle. The first side wall has an exterior surface that defines an outside of the housing and has an interior surface that opposes the exterior surface. The first side wall defines a window through the exterior surface and the interior surface. The first body portion includes a seat defining an orifice in fluid communication with the outlet and the cavity. The valve assembly includes a float disposed inside the cavity and movable between an initial position and a displaced position. The valve assembly also includes a seal secured to the housing and the float. The seal is spaced from the seat when the float is in the initial position to allow fluid communication through the orifice and out of the outlet. The seal engages the seat when the float is in the displaced position to prevent fluid communication through the orifice and out of the outlet. The second body portion includes a second side wall that surrounds the float. The second side wall extends toward the cap such that the first side wall and the second side wall overlap. The second side wall extends across the window to obstruct direct fluid communication between the window and the float. The second side wall is spaced from the first side wall to define a gap that is unobstructed between the first side wall and the second side wall. The gap is in direct fluid communication with the window relative to the interior surface of the housing.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
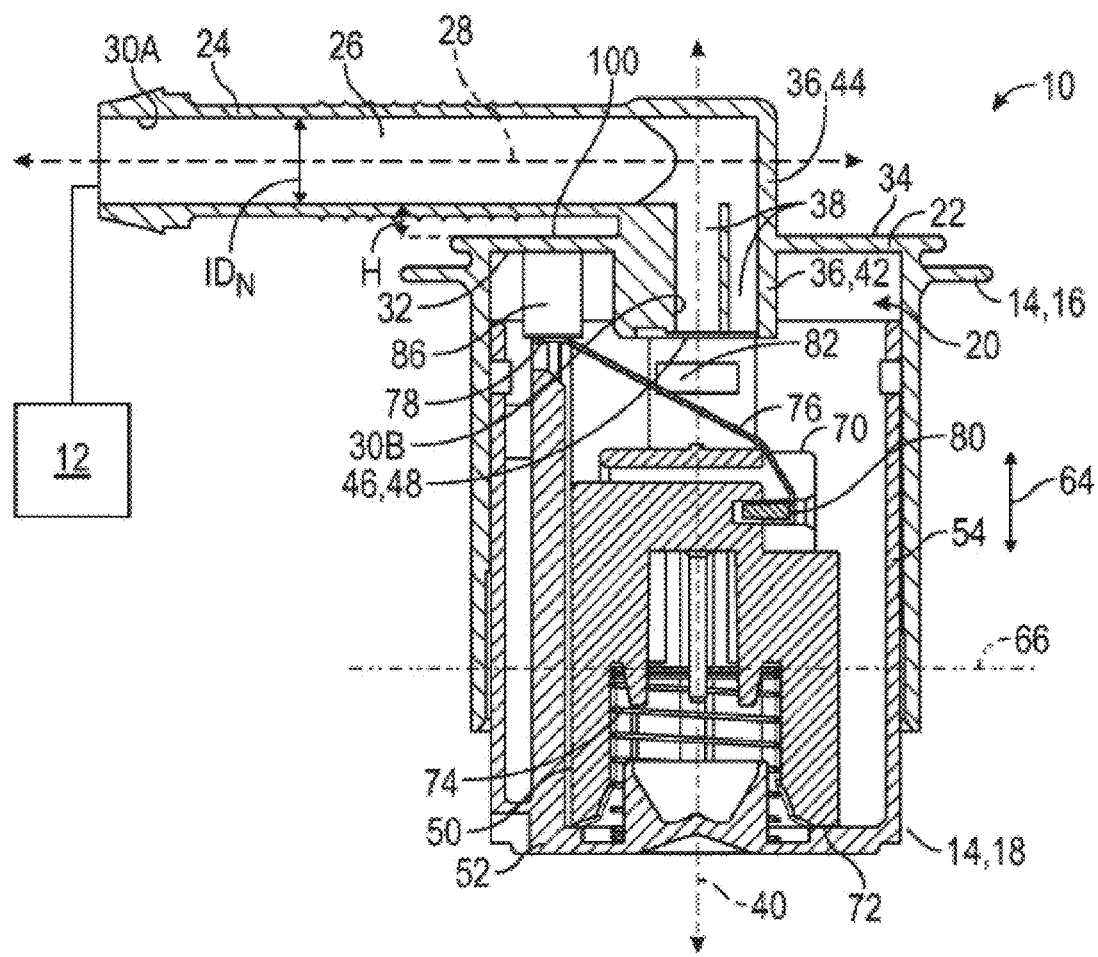
FIG. 1 is a schematic cross-sectional view of a valve assembly of a first configuration.

Referring to the FIGS., wherein like numerals indicate like or corresponding parts throughout the several views, a valve assembly 10 is generally shown in FIG. 1. In certain applications, the valve assembly 10 may be utilized with a tank of a vehicle, and the tank may be a fuel tank. Therefore, liquid fluid, such as fuel may be stored in the tank. It is to be appreciated that the valve assembly 10 may be utilized with tanks other than fuel tanks, and other liquid fluids may be stored in the tank.

The valve assembly 10 described herein may operate as a fill limit vent valve (FLVV). The valve assembly 10 vents vapors during various events. For example, the valve assembly 10 may operate during refueling of the tank. Therefore, the FLVV may operate during the refueling of the tank.

In certain applications, the valve assembly 10 may be attached to the tank. The valve assembly 10 may be internally mounted to the tank or externally mounted to the tank. For the internally mounted valve assembly, the valve assembly 10 may be supported by a bracket inside the tank. For the externally mounted valve assembly, a portion of the valve assembly 10 may be disposed inside the tank and another portion of the valve assembly 10 may be disposed outside of the tank. The features of the valve assembly 10 discussed herein are the same for the internally mounted valve assembly and the externally mounted valve assembly. It is to be appreciated that other components may be utilized with the internally or externally mounted valve assembly 10, such as, for example, components that couple the valve assembly 10 to various components outside of the tank.

Generally, the valve assembly 10 may allow vapors that build up in the tank to be vented out of the tank to a vapor control structure 12. The vapor control structure 12 may store the vapor received from the tank and may be periodically purged. Therefore, under certain conditions, the vapors move or flow from the tank through the valve assembly 10 and into the vapor control structure 12. It is to be appreciated that the vapor control structure 12 may be referred to as a canister, such as a charcoal canister.

Figure 2:
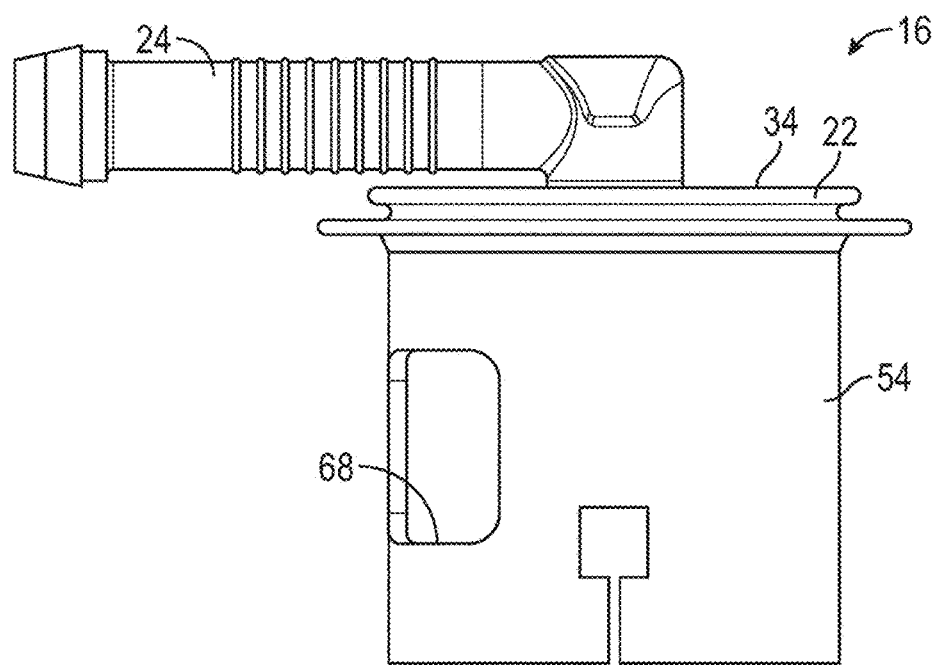
FIG. 2 is a schematic perspective view of a first body portion of the valve assembly of FIG. 1.
Figure 3:
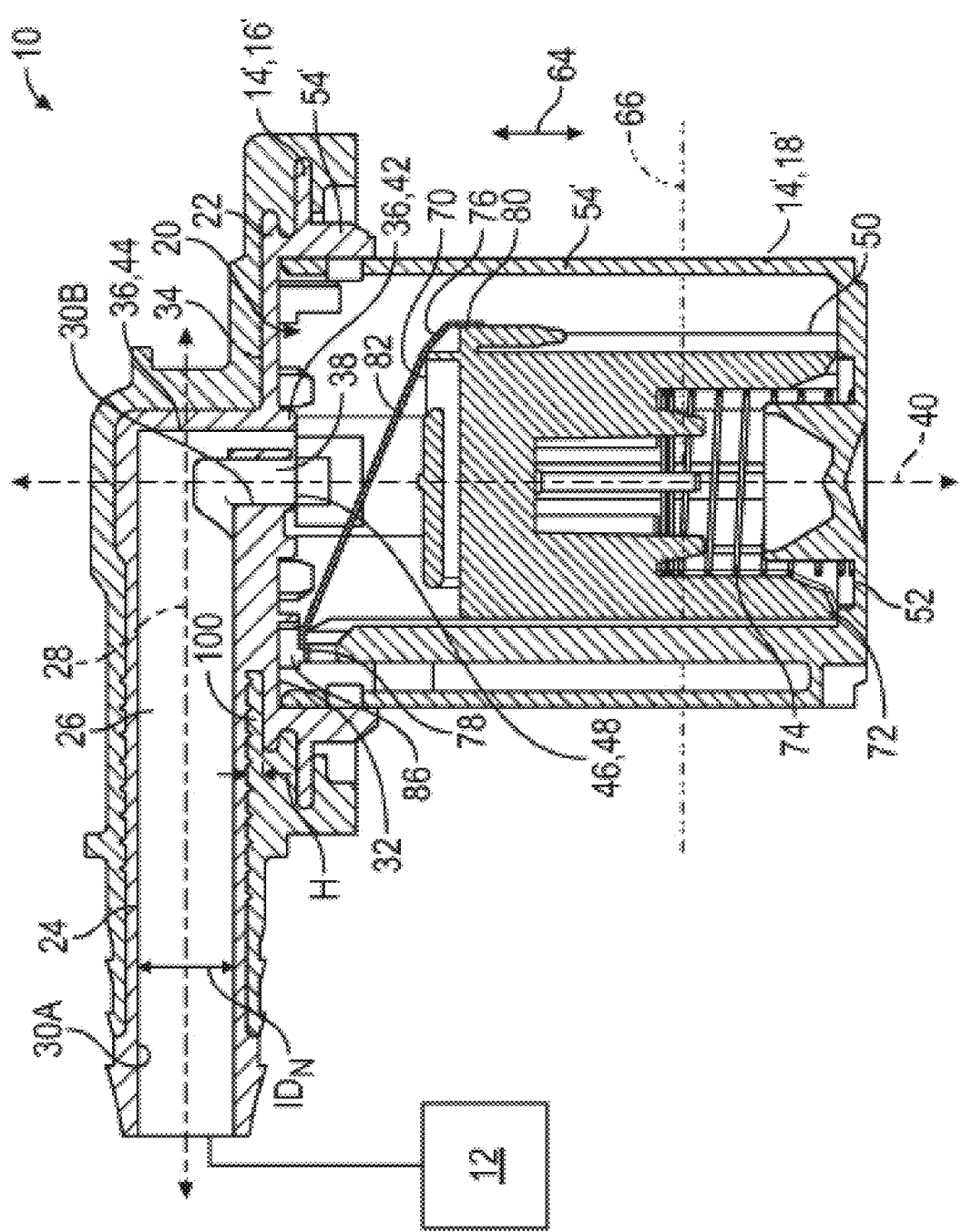
FIG. 3 is a schematic cross-sectional view of a valve assembly of a second configuration.

Referring to FIGS. 1-3, the valve assembly 10 includes a housing 14/14', and in certain configurations, the housing 14/14' is adapted to be attached to the tank. Simply stated, the housing 14/14' is attached or mounted to the tank either internally or externally as discussed above. As best shown in FIGS. 1 and 3, the housing 14/14' includes a first body portion 16/16' and a second body portion 18/18' attached to the first body portion 16/16'. The first body portion 16/16' and the second body portion 18/18' cooperate to enclose a cavity 20, which is discussed further below. FIG. 2 illustrates the first body portion 16/16' without the second body portion 18/18'. For the externally mounted valve assembly, at least part of the first body portion 16/16' of the housing 14/14' is disposed outside of the tank and a second body portion 18/18' of the housing 14/14' is disposed inside of the tank.

Referring to FIGS. 1 and 3, the first body portion 16/16' includes a cap 22 having a nozzle 24 extending from the cap 22. The nozzle 24 defines an outlet 26, and in certain configurations, at least a portion of the outlet 26 is disposed along a first axis 28. The outlet 26 of the nozzle 24 is coupled to the vapor control structure 12. For example, the nozzle 24 may be connected to a tube that is coupled to the vapor control structure 12, such that the outlet 26 vents to the vapor control structure 12. That is, the outlet 26 guides the vapors out of the valve assembly 10 toward the vapor control structure 12. Therefore, generally, the vapors vented out of the tank move or flow out of the housing 14/14' through the outlet 26 and to the vapor control structure 12.

Continuing with FIGS. 1 and 3, the nozzle 24 may include an inner wall 30A that surrounds the outlet 26. Furthermore, the inner wall 30A of the nozzle 24 may surround the first axis 28. That is, the inner wall 30A of the nozzle 24 presents an outer perimeter of the outlet 26. The outlet 26 of the nozzle 24 includes an inner diameter $ID_N$. The inner diameter $ID_N$ of the nozzle 24 may be orientated relative to the inner wall 30A of the nozzle 24 substantially perpendicular to the first axis 28.

Continuing with FIGS. 1 and 3, generally, the cap 22 may include a first wall 32 facing the cavity 20 and a second wall 34 opposing the first wall 32. The nozzle 24 may extend outwardly from the second wall 34.

Again, continuing with FIGS. 1 and 3, the first body portion 16/16' includes a seat 36 defining an orifice 38 in fluid communication with the outlet 26 and the cavity 20. Generally, the orifice 38 of the seat 36 is disposed between the cavity 20 and the outlet 26. In certain configurations, the orifice 38 of the seat 36 may be in direct fluid communication with the outlet 26 of the nozzle 24. Therefore, when vapors are being expelled to the vapor control structure 12, the vapors exit the cavity 20 via the orifice 38 and through the outlet 26. The orifice 38 may be disposed along a longitudinal axis 40. In certain configurations, the first axis 28 and the longitudinal axis 40 are transverse to each other. In other configurations, the first axis 28 and the longitudinal axis 40 are substantially perpendicular to each other.

Continuing with FIGS. 1 and 3, generally, the seat 36 extends from the cap 22. The seat 36 may be entirely disposed inside of the cavity 20 of the housing 14/14' or part of the 30 seat 36 may be disposed inside of the cavity 20 and another part of the seat 36 may be disposed outside of the cavity 20. Therefore, in certain configurations, the seat 36 extends from the cap 22 into the cavity 20. More specifically, in certain configurations, the seat 36 may extend from the first wall 32 of the cap 22 into the cavity 20.

In other configurations, the seat 36 extends through the cap 22 from both of the first and second walls 32, 34. In this configuration, the seat 36 may include a first seat body 42 that extends from the cap 22 into the cavity 20, and a second seat body 44 that extends from the cap 22 outside of the cavity 20. That is, the first seat body 42 extends into the cavity 20 from the first wall 32, and the second seat body 44 extends outwardly away from the cavity 20 from the second wall 34. For the configuration with the first and second seat bodies 42, 44, the orifice 38 is defined through both of the first and second seat bodies 42, 44. Also, for this configuration, the nozzle 24 may extend from the second seat body 44.

Referring to FIGS. 1, 3, 7, and 10, the seat 36 may include a sealing face 46 disposed inside the cavity 20. The sealing face 46 may be disposed at a distal end 48 of the first seat body 42. Other features of the valve assembly 10 selectively engage the sealing face 46, which will be discussed further below.

Figure 9:
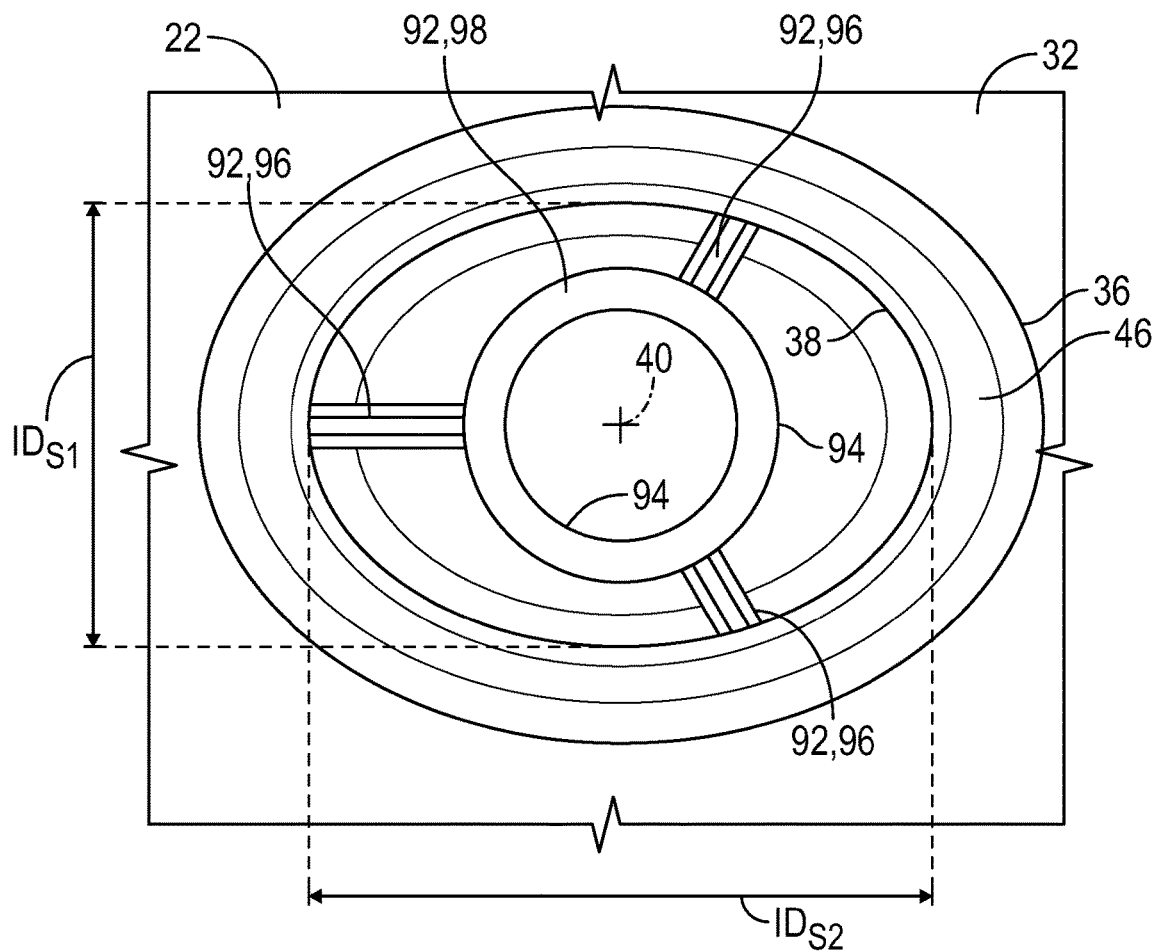
FIG. 9 is a schematic fragmentary enlarged end view of the seat, the orifice, and the insert of FIG. 8.
Figure 12:
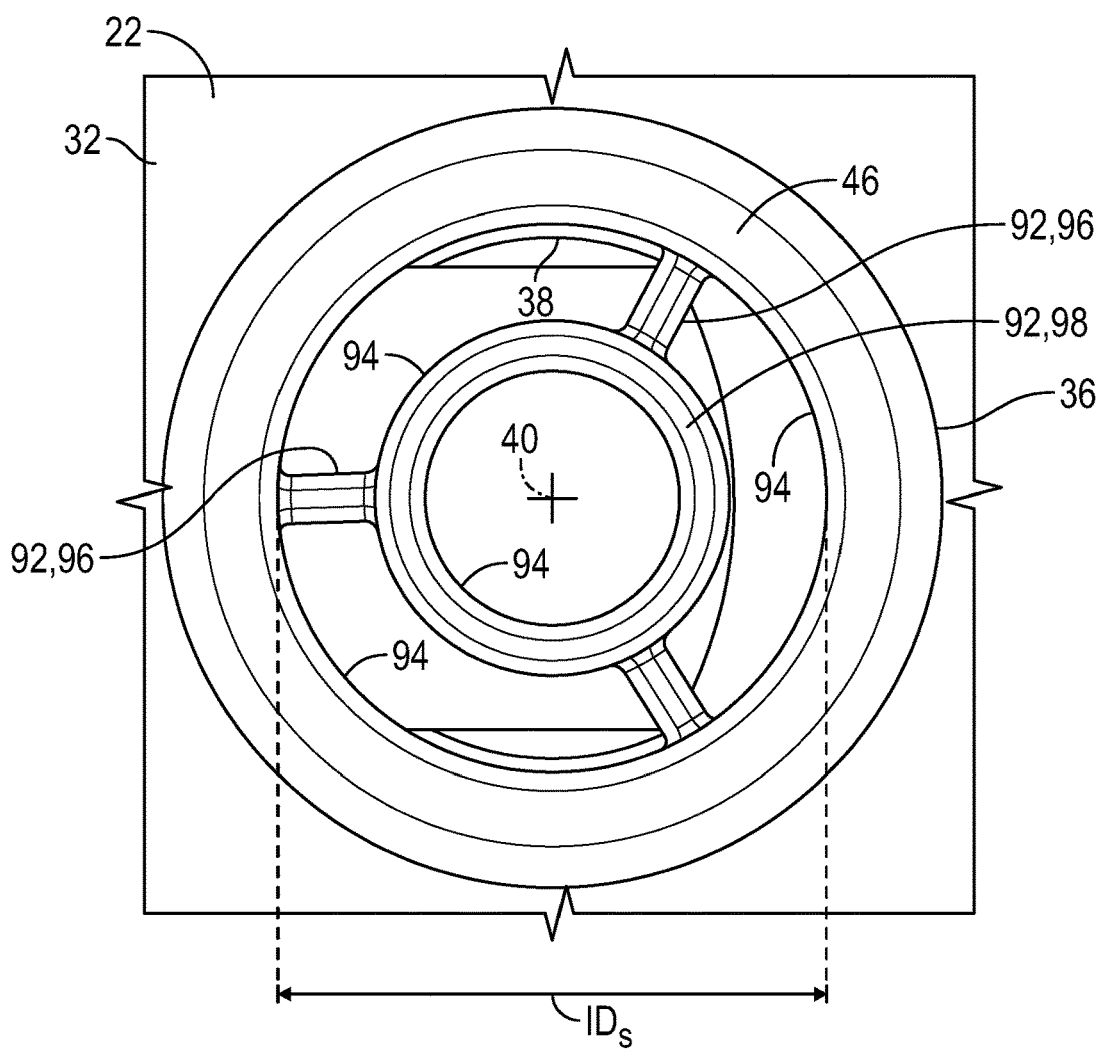
FIG. 12 is a schematic fragmentary enlarged end view of the seat, the orifice, and the insert of FIG. 11.

As best shown in FIGS. 9 and 12, the seat 36 may include an inner wall 30B that surrounds the orifice 38. Furthermore, the inner wall 30B of the seat 36 may surround the longitudinal axis 40. That is, the inner wall 30B of the seat 36 presents an outer perimeter of the orifice 38. The orifice 38 of the seat 36 includes an inner diameter IDs. The inner diameter IDs of the orifice 38 may be orientated relative to the inner wall 30B of the seat 36 substantially perpendicular to the longitudinal axis 40.

As mentioned above, the first body portion 16 and the second body portion 18/18' cooperate to enclose the cavity 20. Turning back to FIGS. 1 and 3, the valve assembly 10 includes a float 50 disposed inside the cavity 20. The second body portion 18/18' may include a base wall 52 that closes a bottom of the cavity 20, and thus prevents the float 50 from exiting the housing 14/14' via the base wall 52. The first body portion 16/16' and/or the second body portion 18/18' may also include a side wall 54/54' that cooperate to surround the float 50. The side wall 54/54' of the first body portion 16/16' may be any suitable length relative to the longitudinal axis 40, and FIGS. 1 and 3 illustrate the option of having different lengths. The side wall 54/54' of the second body portion 18/18' and the base wall 52 may cooperate to close the cavity 20 except at one end. One end of the second body portion 18/18' is open to allow various internal components to be disposed in the cavity 20 during an assembly process. The open end of the second body portion 18/18' is closed via the first body portion 16/16'. Therefore, the first body portion 16/16' and the second body portion 18/18' may be attached to each other via any suitable features, and non-limiting examples may include tabs, fasteners, clips, fingers, ramps, latches, snaps, etc.

Figure 10:
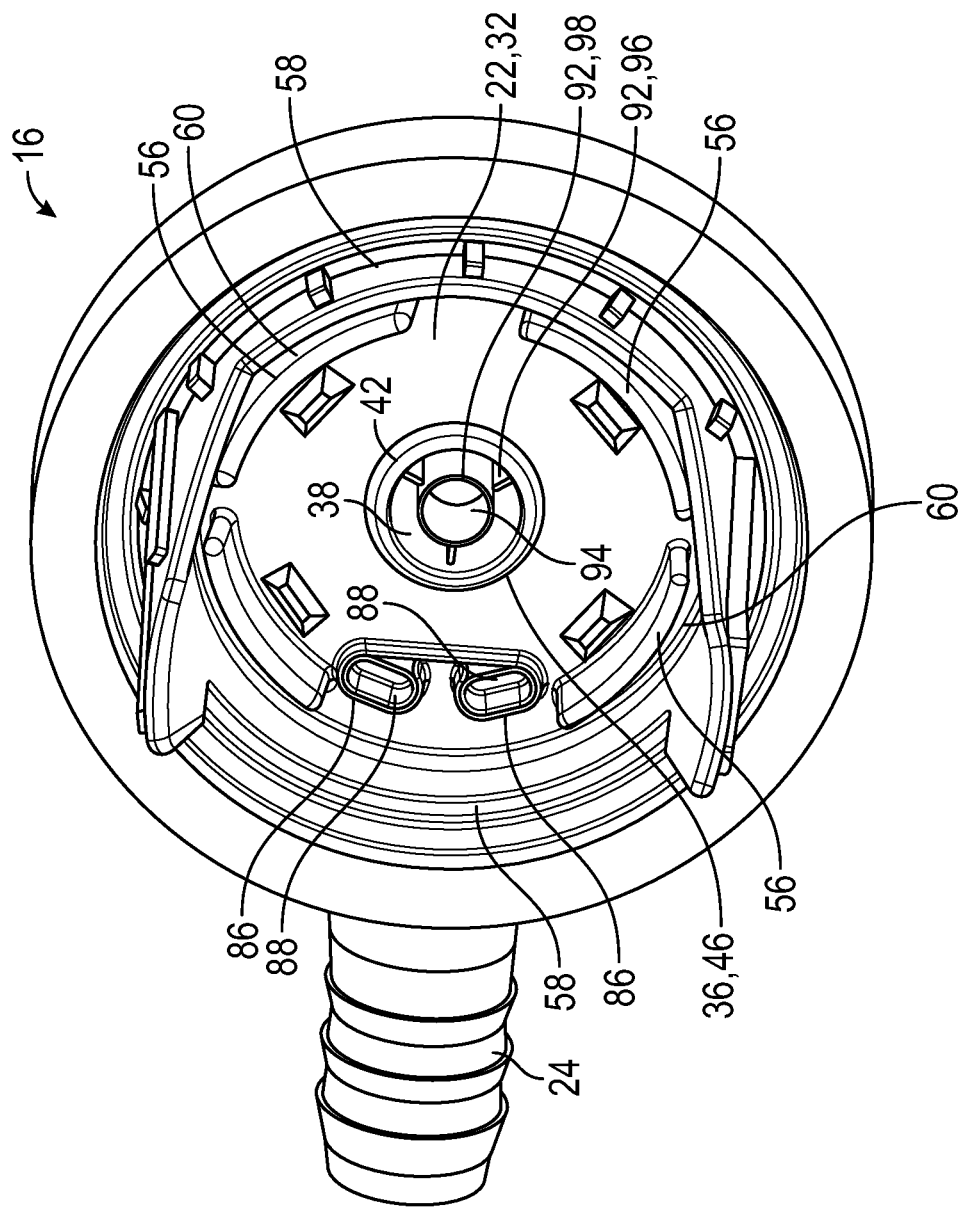
FIG. 10 is a schematic perspective view of the first body portion of FIG. 3, with a side wall of the first body portion removed to illustrate an outer ring and first ridges inside of the outer ring to define a gap therebetween.
Figure 11:
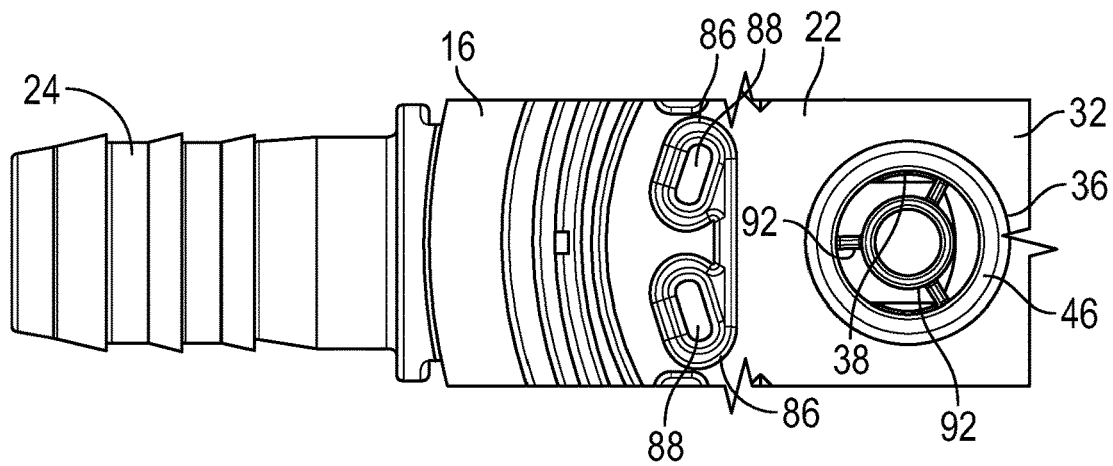
FIG. 11 is a schematic fragmentary end view of the first body portion to illustrate the seat defining the orifice, the insert inside of the orifice, and the columns of FIG. 3.

Furthermore, optionally, the first body portion 16 may include one or more first ridges 56 and an outer ring 58 spaced from each other to present a gap 60 between the first ridges 56 and the outer ring 58 (see FIG. 10). In addition, optionally, the second body portion 18 may include one or more second ridges 62 that face the cap 22 (see FIG. 4) and the second ridges 62 are disposed in the gap 60 between the first ridges 56 and the outer ring 58 when the first and second body portions 16, 18 are attached to each other. Any of the configurations discussed for FIGS. 1-19 may optionally include the first ridges 56, the outer ring 58, the gap 60, and the second ridges 62, even though all of the figures may not illustrate these features.

The float 50 is movable along the longitudinal axis 40, as generally illustrated via the arrow 64, in FIGS. 1 and 3. More specifically, the float 50 is movable between an initial position and a displaced position. In certain configurations, the float 50 is movable axially relative to the longitudinal axis 40 between the initial position and the displaced position. Therefore, the float 50 is movable inside of the cavity 20 between the initial position and the displaced position. Generally, the initial position of the float 50 is when the float 50 is positioned away from or moves away from the seat 36 to allow fluid communication through the orifice 38 of the seat 36, and the displaced position of the float 50 is when the float 50 is positioned toward or moves toward the seat 36 to prevent fluid communication through the orifice 38 of the seat 36. Therefore, the valve assembly 10 is configured to vent the vapors out of the outlet 26 during certain events, such as refueling of the tank, when the float 50 is in the initial position. Furthermore, when the float 50 is in the displaced position, vapors are not vented out of the outlet 26 via the nozzle 24.

The float 50 is movable between the initial position and the displaced position relative to the housing 14/14' in response to a liquid fluid level 66 inside the tank. Liquid fluid may enter the housing 14/14' through various voids 68 around the housing 14/14', and thus, the liquid fluid may at least partially fill the cavity 20 by entering the voids 68. Some of the voids 68 are best illustrated in FIG. 2, but it is to be appreciated that the voids 68 of FIG. 2 are suitable for any of the configurations discussed herein.

When the float 50 is combined with a biasing force, which is discussed further below, the float 50 is buoyant in the liquid fluid, such as the fuel, inside of the cavity 20. Thus, the float 50 may move axially relative to the longitudinal axis 40 depending on the liquid fluid level 66 of the fuel inside the tank. For example, if the liquid fluid level 66 rises, the float 50 moves toward the seat 36 and toward the displaced position. As another example, if the liquid fluid level 66 descends, the float 50 moves away from the seat 36 and toward the initial position.

Referring to FIGS. 1 and 3, the float 50 may include a first end 70 and a second end 72 spaced from each other relative to the longitudinal axis 40. The valve assembly 10 may also include a biasing member 74 disposed in the cavity 20 between the float 50 and the base wall 52. More specifically, the biasing member 74 may engage the second end 72 of the float 50 and the base wall 52 to continuously bias the float 50 toward the seat 36. In other words, the biasing member 74 applies the biasing force to the float 50. The base wall 52 provides a surface for the biasing member 74 to react against. This biasing force overcomes the weight of the float 50. It is to be appreciated that in a roll-over situation, the float 50 will move to the displaced position without the buoyancy of the float 50 affecting the float's position due to the biasing force applied to the float 50 overcoming the buoyancy of the float the weight of the float 50, etc. Therefore, when in the roll-over situation, the biasing member 74 assists in maintaining the float 50 in the displaced position. In certain configurations, the biasing member 74 may be a spring, such as a coil spring. It is to be appreciated that the biasing member 74 may be any suitable configuration to continuously bias the float 50 toward the seat 36.

Referring to FIGS. 1 and 3-5, the valve assembly 10 also includes a seal 76 secured to the housing 14/14' and the float 50. In other words, the seal 76 is anchored to the float 50 and the housing 14/14'. Due to the way the seal 76 is anchored to the housing 14/14' and the float 50, the seal 76 extends between the float 50 and the seat 36. More specifically, the seal 76 extends across the first end 70 of the float 50 such that at least a portion of seal 76 overlaps at least a portion of the float 50. Furthermore, at least a portion of the seal 76 overlaps the seat 36. As such, during movement of the float 50 between the initial position and the displaced position, at least part of the seal 76 moves with the float 50. Generally, the seal 76 selectively engages the seat 36 depending on the position of the float 50 to either allow or prevent venting out the outlet 26, as discussed further below. Furthermore, generally, the sealing face 46 of the seat 36 faces the seal 76. The seal 76 engages the sealing face 46 when the float 50 is in the displaced position.

The seal 76 is disposed between the float 50 and the seat 36 to selectively engage the seat 36 depending on the position of the float 50. For example, the seal 76 is spaced from the seat 36 when the float 50 is in the initial position and the seal 76 engages the seat 36 when the float 50 is in the displaced position. Therefore, the seal 76 is spaced from the seat 36 when the float 50 is in the initial position to allow fluid communication between the cavity the orifice 38, and the outlet 26. In certain configurations, the orifice 38 of the seat 36 may be in direct fluid communication with the cavity 20 when the float 50 is in the initial position. The seal 76 engages the seat 36 when the float 50 is in the displaced position to prevent fluid communication between the cavity 20 and the orifice 38.

Continuing with FIGS. 1 and 3-5, the seal 76 may include a first end 78 secured to the housing 14/14' and a second end 80 secured to the float 50. In certain configurations, the seal 76 may include an engagement portion 82 disposed between the first end 78 and the second end 80. The seal 76 engages the seat 36 between the first end 78 and the second end 80 of the seal 76 when the float 50 is in the displaced position. More specifically, the engagement portion 82 engages the seat 36 when the float 50 is in the displaced position, and therefore, prevents fluid communication from the cavity 20 through the orifice 38. In certain configurations, the engagement portion 82 of the seal 76 engages the sealing face 46 when the float 50 is in the displaced position.

As best shown in FIGS. 1 and 3, the seal 76 may be thinner (thickness T; labeled in FIGS. 5 and 6) than a length L (labeled in FIG. 4) of the seal 76. Furthermore, the seal 76 may narrow at the second end 80 (see FIG. 5). Generally, this type of configuration of the seal 76 may be referred to as a ribbon seal 76.

The seal 76 may be formed of a flexible material. The flexible material is capable of being bent and/or stretched without permanent deformation. As a non-limiting example, the seal 76 may be formed of an elastomeric material. One non-limiting example of the elastomeric material of the seal 76 includes fluorosilicone, etc.

Figure 4:
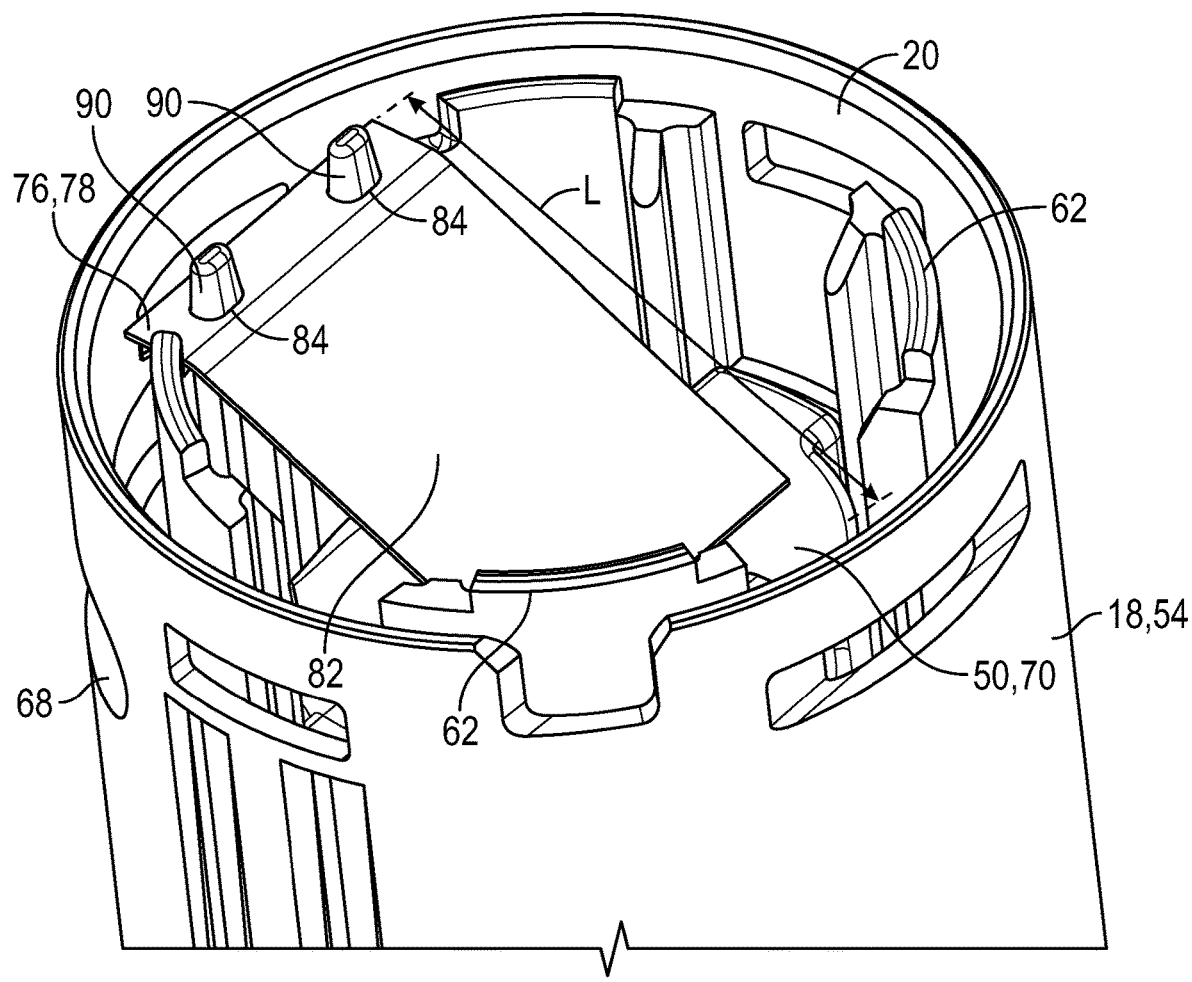
FIG. 4 is a schematic fragmentary perspective of a second body portion open at one end to illustrate a seal and a float inside of the second body portion, which is suitable for any of the configurations herein.
Figure 5:
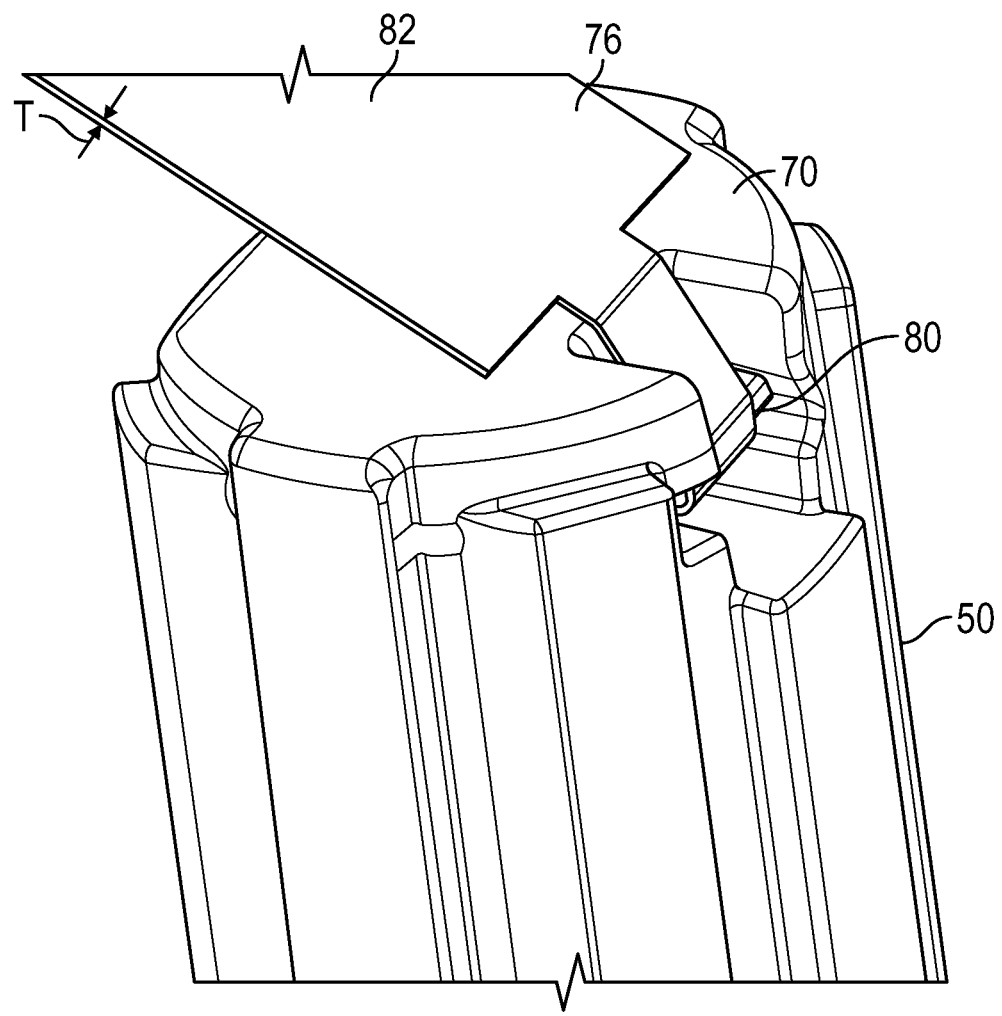
FIG. 5 is a schematic fragmentary perspective view of the seal and the float of FIG. 4.
Figure 6:
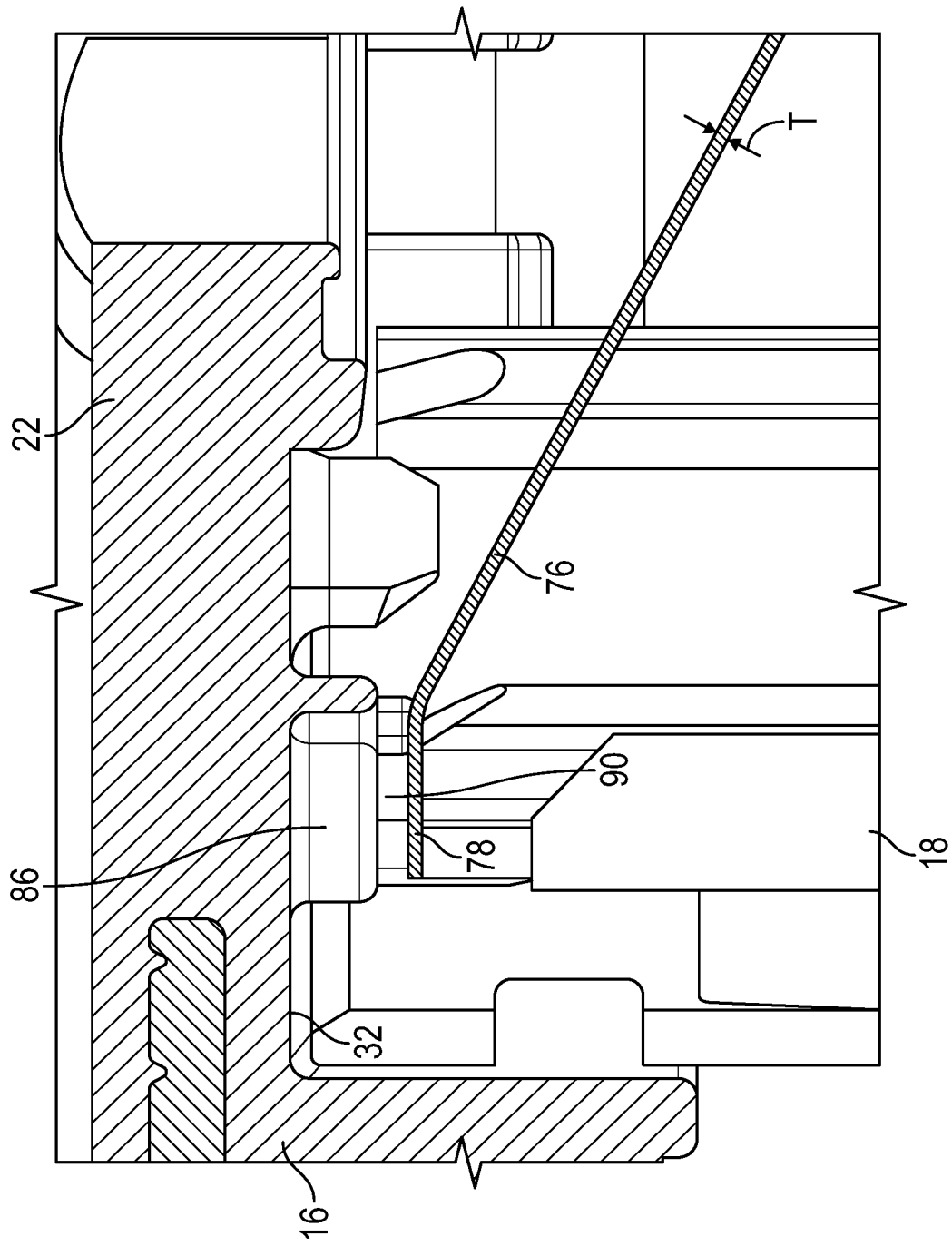
FIG. 6 is a schematic fragmentary cross-sectional view of a first end of the seal attached to a column of the first body portion and a post of the second body portion.

Next, the features to anchor the first end 78 of the seal 76 to the housing 14 are discussed with reference to FIGS. 1, 3, 4, 6, 7, 10, and 11. In certain configurations, the first end 78 of the seal 76 may define a hole 84 (as best shown in FIG. 4). In other configurations, the first end 78 of the seal 76 may define more than one hole 84. Therefore, optionally, the hole 84 of the first end 78 of the seal 76 is further defined as a plurality of holes 84. When using more than one hole 84, the holes 84 are spaced from each other. The hole(s) 84 are used to secure the first end 78 of the seal 76 to the housing 14. Some of the features of FIG. 4 are suitable for any of the configurations of FIGS. 1-19, while other features of FIG. 4 are suitable for any of the configurations of FIGS. 1-29, and the features of FIG. 5 are suitable for any configurations of FIGS. 1-29.

Generally, the first body portion 16 of the housing 14 may include a column 86 (see FIGS. 1, 3, 6, 7, and 10) disposed inside the cavity 20, and is spaced from the seat 36. Furthermore, the first end 78 of the seal 76 is secured to the column 86. In certain configurations, the first wall 32 of the cap 22 may include the column 86 extending into the cavity 20 and spaced from the seat 36. The first end 78 of the seal 76 may be secured to the column 86.

Optionally, the first body portion 16 may include more than one column 86. Therefore, in certain configurations, the column 86 is further defined as a plurality of columns 86, and the columns 86 may be disposed inside of the cavity 20. The columns 86 may be spaced from each other, and spaced from the seat 36. Each of the columns 86 may extend from the first wall 32 of the cap 22 into the cavity 20. When using the plurality of columns 86, the first end 78 of the seal 76 defines the plurality of holes 84, with one of the holes 84 cooperating with one of the columns 86, and another one of the holes 84 cooperating with another one of the columns 86.

Figure 7:
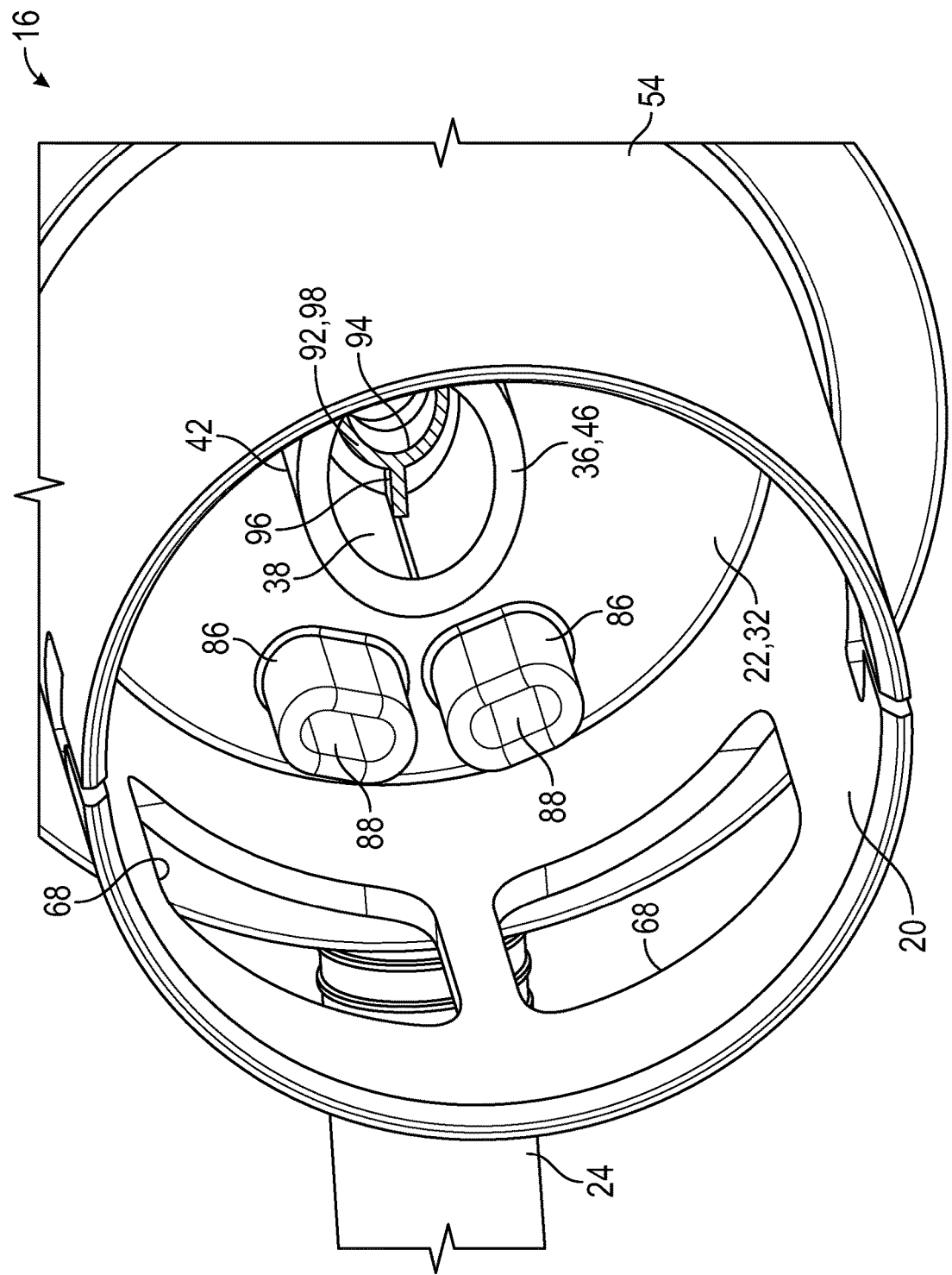
FIG. 7 is a schematic fragmentary perspective bottom view of the first body portion of FIG. 1, which illustrates the seat defining an orifice, an insert inside of the orifice, and a plurality of columns.

Furthermore, as best shown in FIGS. 7 and 10, the column 86 may define a pocket 88 open to the cavity 20. In certain configurations, the columns 86 may each define the pocket 88 open to the cavity 20. That is, the pocket 88 may be further defined as a plurality of pockets 88, and in this configuration, one of the pockets 88 may be defined in each of the columns 86, and the pockets 88 are open to the cavity 20.

Generally, the first end 78 of the seal 76 is secured to a portion of the second body portion 18, and the portion of the second body portion 18 is disposed in the pocket 88 of the column 86 to secure the seal 76 to the housing 14. In certain configurations, the portion of the second body portion 18 is disposed in the pocket 88 of each of the columns 86 to secure the seal 76 to the housing 14.

More specifically, as best shown in FIG. 4, the second body portion 18 may include a post 90, and in certain configurations, the portion of the second body portion 18 is further defined as the post 90. The post 90 may be disposed through the hole 84 of the first end 78 of the seal 76 and into the pocket 88 to secure the first end 78 of the seal 76 to the housing 14.

In certain configurations, the post 90 of the second body portion 18 is further defined as a plurality of posts 90. In this configuration, each of the posts 90 is disposed through a respective one of the holes 84 of the first end 78 of the seal 76 and the posts 90 are disposed into the pocket 88 of the respective columns 86 to secure the first end 78 of the seal 76 to the housing 14.

Next, additional features of the seat 36 and the orifice 38 are discussed with reference to FIGS. 8, 9, 11, and 12. It may be desirable to prevent the seal 76 from entering the orifice 38 when the seal 76 engages the sealing face 46. Therefore, optionally, the seat 36 may include an insert 92 disposed inside of the orifice 38 adjacent to the sealing face 46 to prevent the engagement portion 82 of the seal 76 from entering the orifice 38 beyond the insert 92. More specifically, the insert 92 may extend from the inner wall 30B of the seat 36 to partially block the orifice 38. The insert 92 may define at least one opening 94 to allow fluid communication between the cavity 20 and the orifice 38 when the float 50 is in the initial position. In certain configurations, the insert 92 may include one or more ribs 96 attached to the inner wall 30B of the seat 36, and the ribs 96 extend into the orifice 38 to support a center portion 98 of the insert 92. The center portion 98 of the insert 92 may be any suitable configuration, and one non-limiting example includes a ring as shown in FIGS. 8, 9, 11, and 12. The openings 94 may be disposed between the ribs 96 and the center portion 98, and/or through the center portion 98. The insert 92 is shown in cross-section in FIG. 7 for illustrative purposes.

Turning to FIGS. 1, 3, 9, and 12, the outlet 26 of the nozzle 24 and the orifice 38 of the seal 76 may be different diameters, which may assist in forming the first body portion 16 of the housing 14. For example, by utilizing different diameters, molding of the nozzle 24 and the seat 36 with the cap 22 may be more practical. As mentioned above, the outlet 26 of the nozzle 24 includes the inner diameter $ID_N$, and the orifice 38 of the seat 36 includes the inner diameter $ID_S$. Generally, the inner wall 30A of the nozzle 24 defines a circular configuration. In this configuration, the inner diameter $ID_N$ of the outlet 26 is greater than the inner diameter $ID_S$ of the orifice 38. By configuring the inner diameter $ID_N$ of the outlet 26 greater than the inner diameter $ID_S$ of the orifice 38, molding of the nozzle 24 and the seat 36 may be easier. Generally, for FIGS. 11 and 12, the configuration of the outlet 26 of the nozzle 24 and the configuration of the orifice 38 of the seat 36 are both circular configurations.

Figure 8:
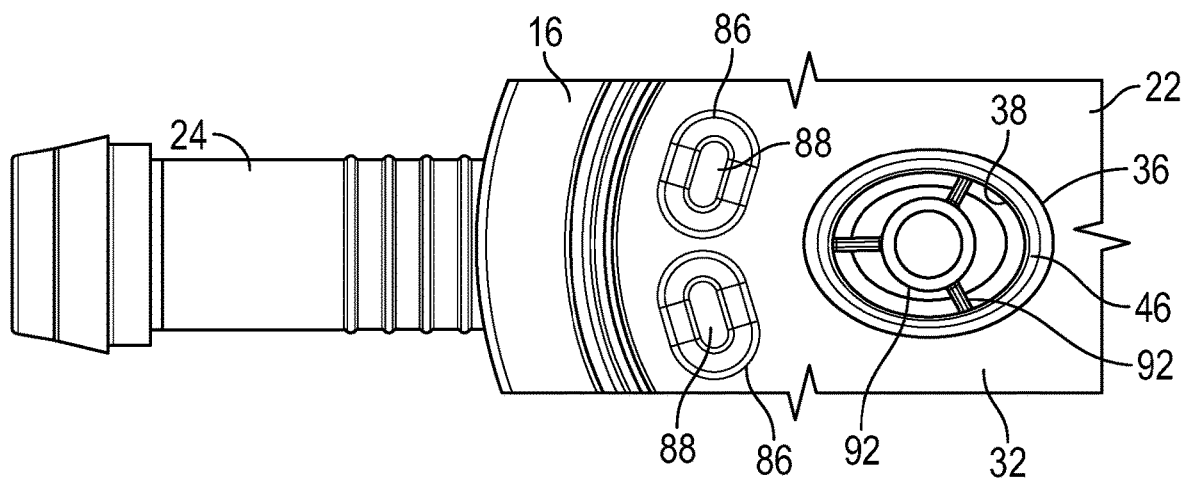
FIG. 8 is a schematic fragmentary end view of the first body portion to illustrate the seat defining the orifice, the insert inside of the orifice, and the columns of FIG. 7.

As another example, referring to FIGS. 8 and 9, the inner wall 30B of the seat 36 defines an elliptical configuration to present a first inner diameter $ID_{S1}$ of the orifice 38 and a second inner diameter $ID_{S2}$ of the orifice 38. In this configuration, the first inner diameter $ID_{S1}$ is less than the second inner diameter $ID_{S2}$. Again, the inner wall 30A of the nozzle 24 defines the circular configuration which presents the inner diameter $ID_N$ greater than the first inner diameter $ID_{S1}$ of the inner wall 30B of the seat 36. By configuring the inner diameter $ID_N$ of the outlet 26 greater than the first inner diameter $ID_{S1}$ of the orifice 38, molding of the nozzle 24 and the seat 36 may be easier.

In addition, turning back to FIGS. 1 and 3, a height H of the seat 36 relative to the cap 22 may be adjusted, which changes a height of the ribs 96 inside of the orifice 38. Therefore, a space 100 between the nozzle 24 and the cap 22 relative to the second wall 34 of the cap 22 may be adjusted by changing the height H of the seat 36. For example, a height of the second seat body 44 outside of the cap 22 may be changed. A flow area of the orifice 38 may be adjusted by changing the height H of the seat 36, and thus, may be adjusted to meet the desired flow area of the orifice 38.

As best shown in FIGS. 1-3 and 13, generally, the first body portion 16/16' of the housing 14/14' is formed as one piece. By forming the first body portion 16/16' as one piece, a separate top cap from a housing may be eliminated, and furthermore an o-ring to seal between the separate top cap and the housing may be eliminated. More specifically, the cap 22, the nozzle 24, and the seat 36 are formed together as one piece. That is, the cap 22, the nozzle 24, and the seat 36 are integral with each other to form a one-piece component. Therefore, the cap 22, the nozzle 24, and the seat 36 are formed as one piece when forming the first body portion 16/16'. In certain configurations, the column 86 and the cap 22 are formed together as one piece. That is, the column 86 and the cap 22 are integral with each other to form a one-piece component. Furthermore, in certain configurations, the insert 92 and the seat 36 are formed as one piece. That is, the insert 92 and the seat 36 are integral with each other to form a one-piece component. By forming these features (the cap 22, the nozzle 24, the seat 36, the column 86, and the insert 92) of the first body portion 16/16' together, the first body portion 16/16' herein also eliminates the need to have to inventory and/or transport additional separate parts, such as the separate top cap and the o-ring. In addition, the valve assembly 10 design described herein does not need any new assembly lines, and thus, a seamless transition may be accomplished.

Therefore, the present disclosure also provides a method of forming the valve assembly 10. Generally, the first body portion 16/16' is formed via molding. More specifically, the cap 22, the nozzle 24, and the seat 36 are formed as one piece when forming the first body portion 16/16'. In certain configurations, forming the first body portion 16/16' is further defined as molding the first body portion 16/16' of the housing 14/14' inside of a mold 102 to form the cap 22, the nozzle 24, and the seat 36 as one piece. More specifically, in certain configurations, molding may be further defined as injection molding the first body portion 16/16' of the housing 14/14' inside of the mold 102 to form the cap 22, the nozzle 24, and the seat 36 as one piece. These features of the first body portion 16/16' may be easily molded together. Additional reasons for forming the cap 22, the nozzle 24, and the seat 36 as one piece are discussed in the paragraph immediately above.

The first body portion 16/16' may be formed of any suitable materials, and non-limiting examples may include a polymeric material, nylon, polyoxymethylene (POM), etc. Therefore, the first body portion 16/16', which includes the cap 22, the nozzle 24, and the seat 36 may be formed of the polymeric material or any other suitable material that may be molded. Non-limiting examples of the polymeric material of the first body portion 16/16' may include plastic, nylon, POM, etc.

Figure 13:
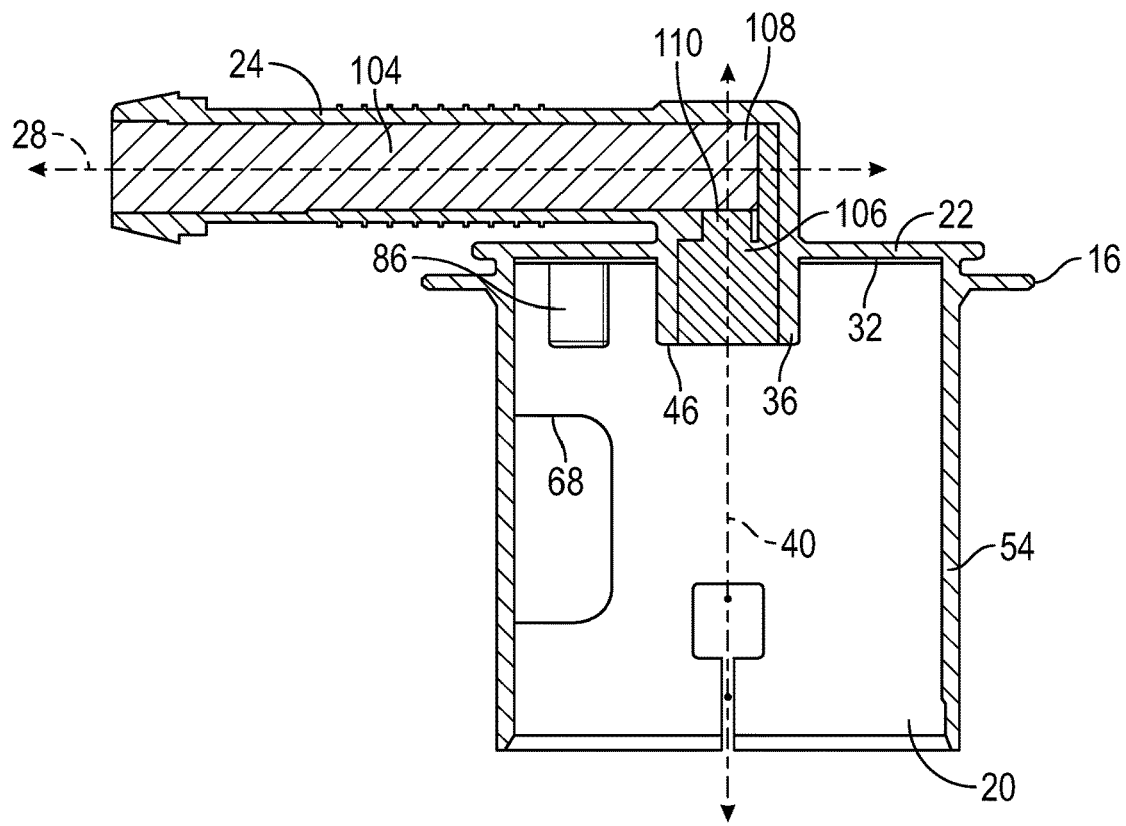
FIG. 13 is a schematic cross-sectional view of the first body portion molded using a first core to form an outlet of a nozzle and a second core to form the orifice of the seat.
Figure 14:
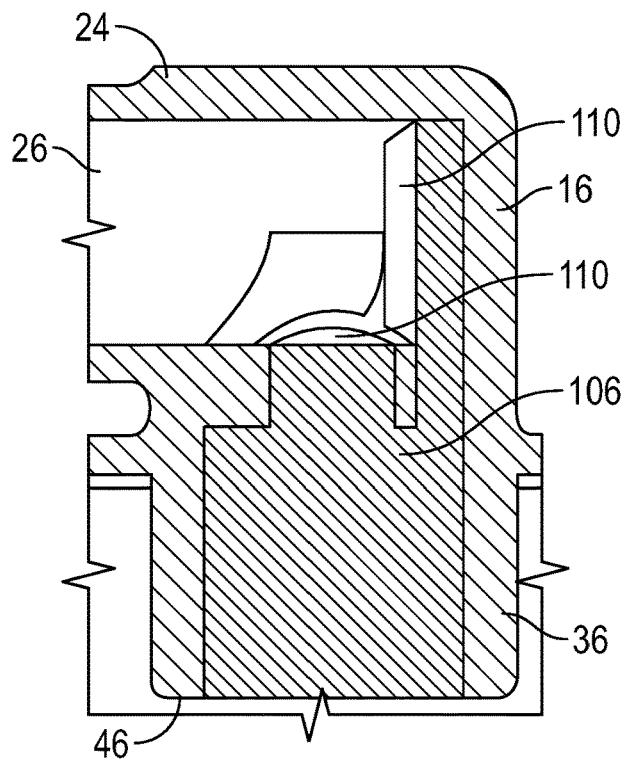
FIG. 14 is a schematic fragmentary cross-sectional view of the first body portion illustrating the second core disposed inside of the seat, with the first core removed.
Figure 15:
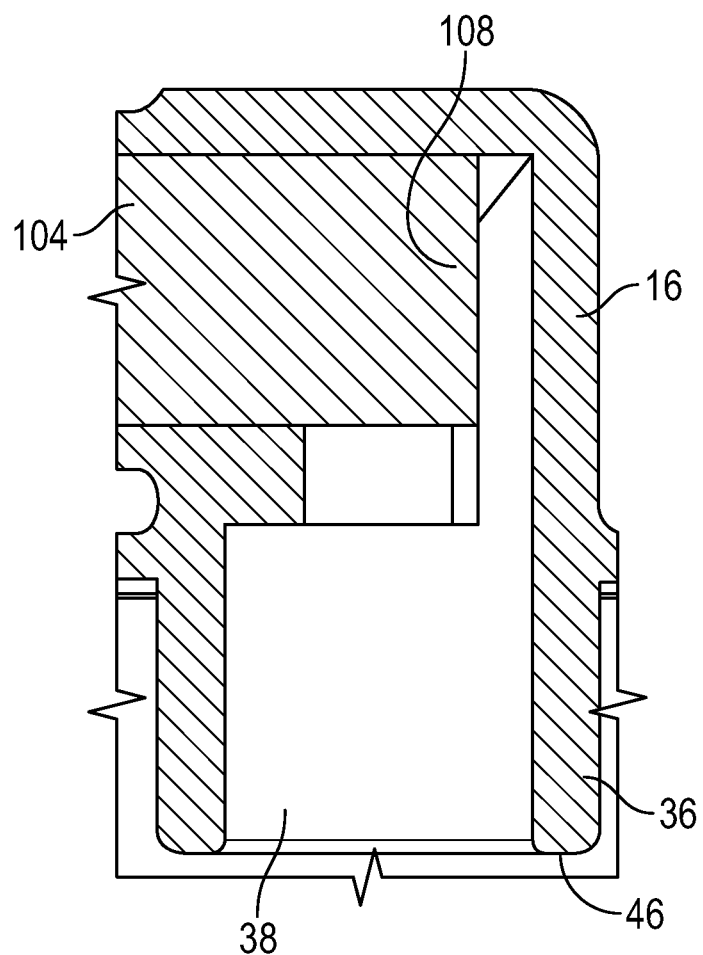
FIG. 15 is a schematic fragmentary cross-sectional view of the first body portion illustrating the first core disposed inside of the seat, with the second core removed.
Figure 16:
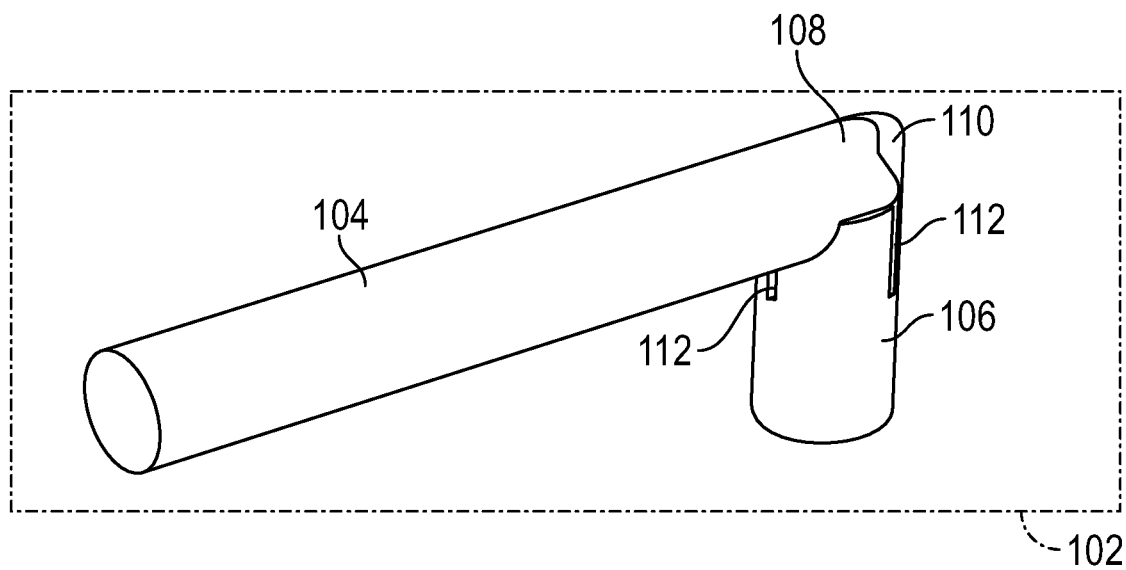
FIG. 16 is a schematic perspective view of the first core and the second core attached to each other to form a sub-core.
Figure 17:
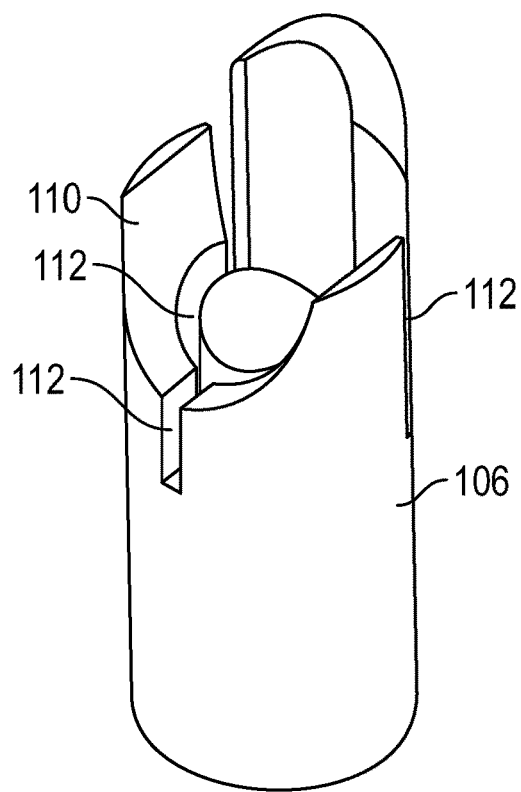
FIG. 17 is a schematic perspective view of the second core including a core seat.
Figure 18:
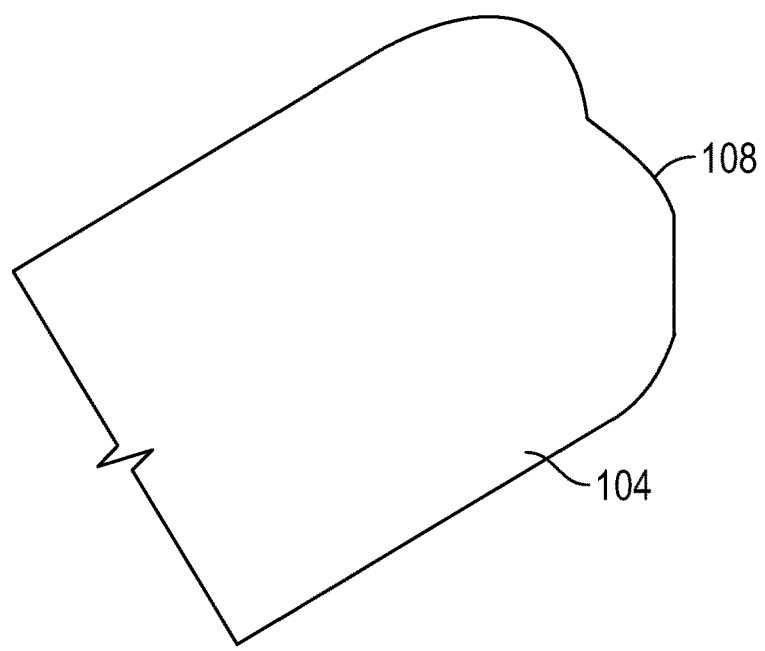
FIG. 18 is a schematic fragmentary perspective view of the first core including a mating end.
Figure 19:
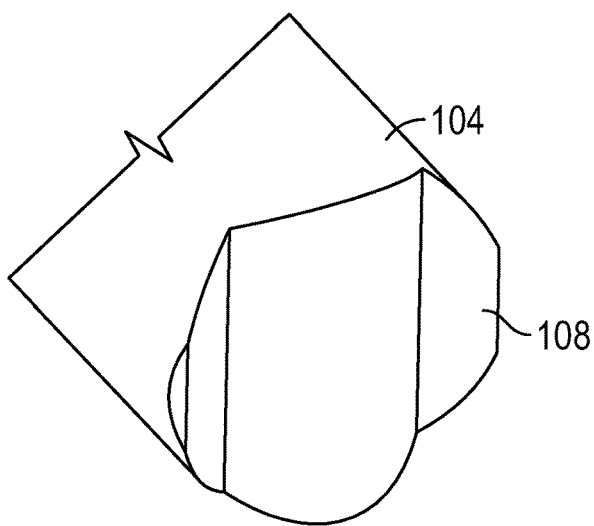
FIG. 19 is another schematic fragmentary perspective view of the mating end of the first core.

To form the outlet 26 of the nozzle 24 and the orifice 38 of the seat 36, cores 104, 106 may be used as shown in FIGS. 13-19. Specifically, as best shown in FIGS. 13 and 16, a first core 104 and a second core 106 are attached together to form a sub-core. The first core 104 may include a mating end 108 (as best shown in FIG. 19) and the second core 106 may include a core seat 110 (as best shown in FIG. 17) that receives the mating end 108 of the first core 104 to attach together the first and second cores 104, 106, and also provide easy separation of the first and second cores 104, 106. Referring to FIGS. 17-19, the mating end 108 and the core seat 110 each include a configuration that is complementary to each other to provide a tight fit so that molding material does not enter undesirable locations.

The sub-core is positioned inside the mold 102 (shown in phantom lines, dash-dot-dot-dash lines), in FIG. 16. Molding material(s) are disposed inside the mold 102 and once cured may be removed from the mold 102. The first body portion 16 of the housing 14 is formed inside the mold 102 to present the cap 22, the nozzle 24 formed around the first core 104, and the seat 36 formed around the second core 106. Furthermore, during molding, the column(s) 86, the insert 92, the first ridges 56, and the outer ring 58 may be formed as well.

After the first body portion 16 is formed, the first core 104 and the second core 106 are removed from the first body portion 16. The first and second cores 104, 106 are separable as indicated via FIGS. 14 and 15. The first core 104 is removed from the first body portion 16 to present the outlet 26 of the nozzle 24. The second core 106 is removed from the first body portion 16 to present the orifice 38 of the seat 36. The second core 106 may also define a plurality of grooves 112 and/or channels 112 to form the insert 92 inside of the orifice 38. Therefore, once the second core 106 is removed, the seat 36 may be formed with the orifice 38 and the insert 92.

In certain configurations, the first core 104 is removed from the nozzle 24 before the second core 106 is removed from the seat 36. In other configurations, the second core 106 is removed from the seat 36 before the first core 104 is removed from the nozzle 24. Generally, the first core 104 exits the outlet 26 via moving along the first axis 28, and the second core 106 exits the orifice 38 via moving along the longitudinal axis 40.

In addition to the above discussed configuration of FIGS. 1-19, other configurations are contemplated, such as the configurations of FIGS. 20-29, which are discussed in detail below.

Figure 20:
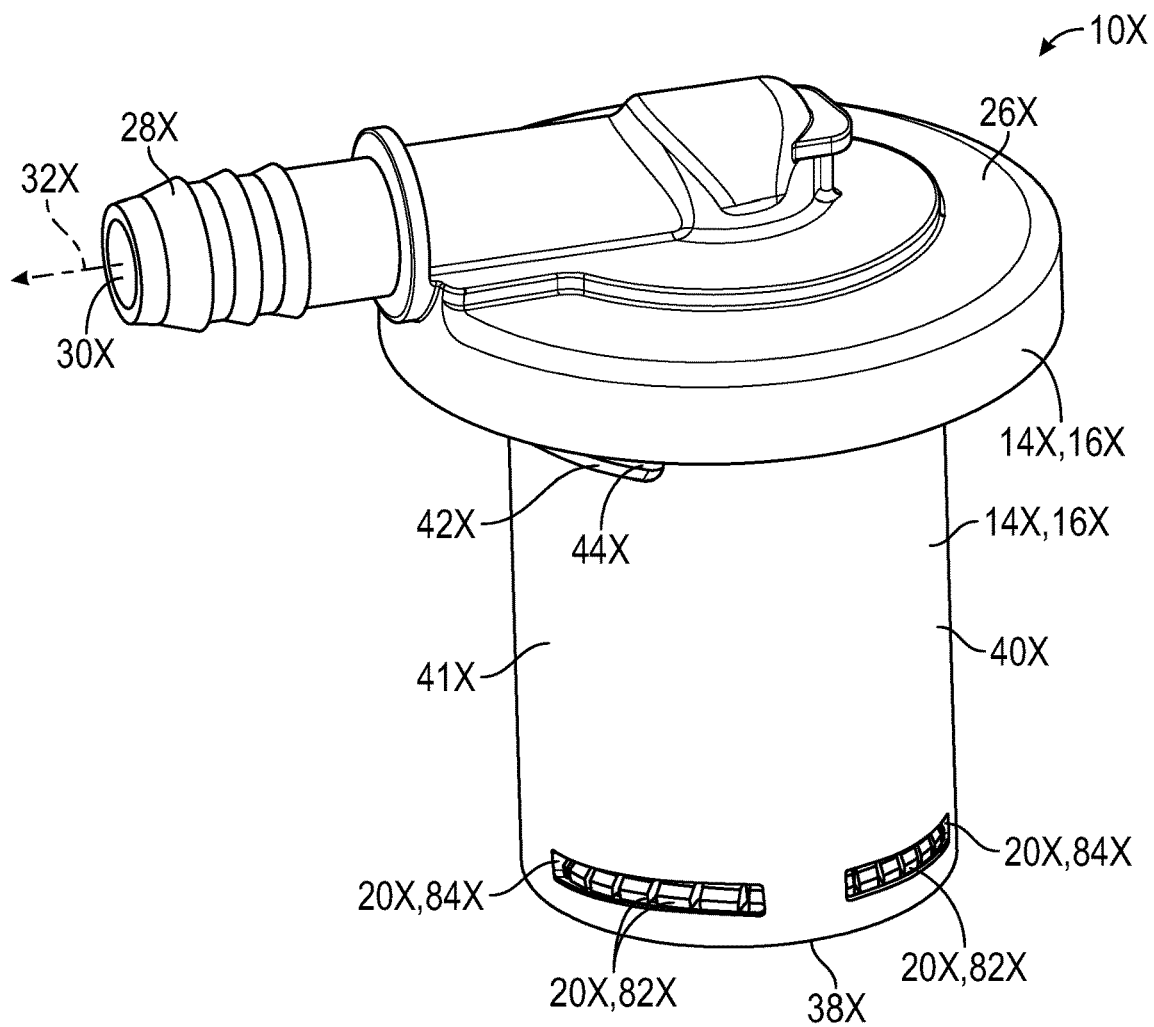
FIG. 20 is a schematic perspective view of another valve assembly that utilizes a first attachment configuration.
Figure 25:
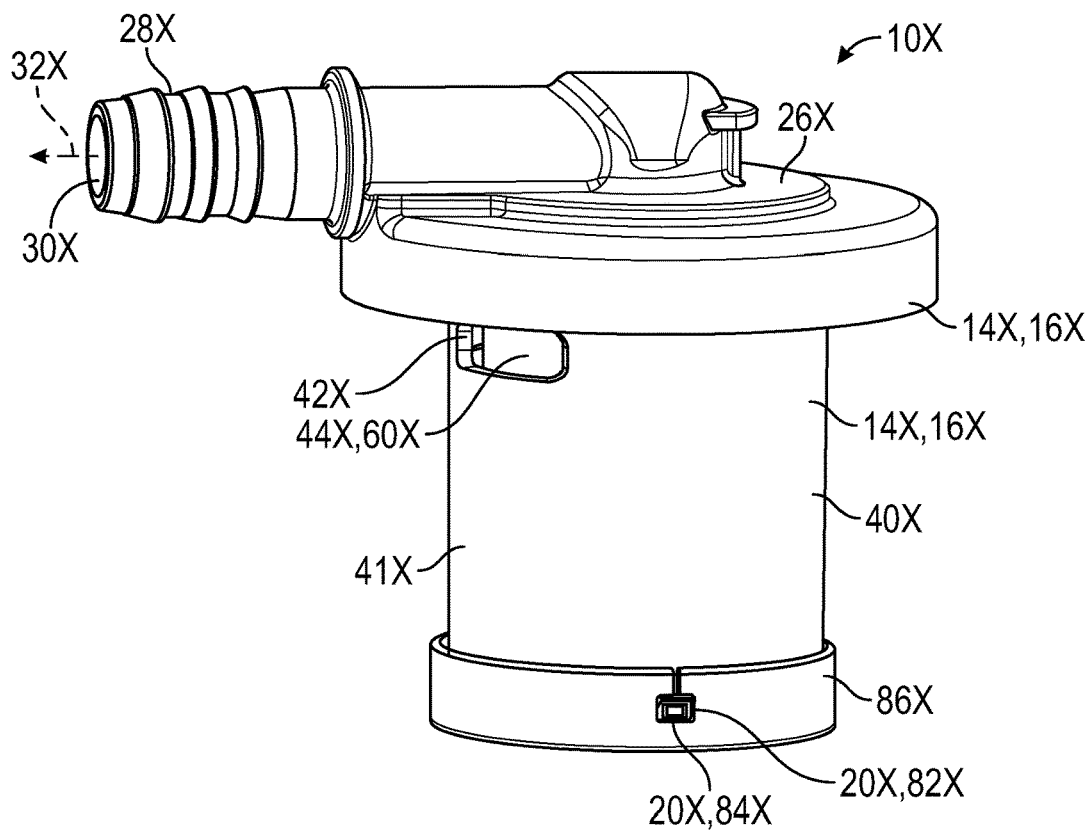
FIG. 25 is a schematic perspective view of yet another valve assembly that utilizes a second attachment configuration.

A valve assembly 10X is generally shown in FIGS. 20 and 25 that illustrate example attachment configurations, which will be discussed further below. In certain applications, the valve assembly 10X may be utilized with a tank of a vehicle, and the tank may be a fuel tank. Therefore, liquid fluid, such as fuel may be stored in the tank. It is to be appreciated that the valve assembly 10X may be utilized with tanks other than fuel tanks, and other liquid fluids may be stored in the tank.

In certain applications, the valve assembly 10X may be attached to the tank. The valve assembly 10X may be internally mounted to the tank or externally mounted to the tank. For the internally mounted valve assembly, the valve assembly 10X may be supported by a bracket inside the tank. For the externally mounted valve assembly, a portion of the valve assembly 10X may be disposed inside the tank and another portion of the valve assembly may be disposed outside of the tank. The features of the valve assembly 10X discussed herein are the same for the internally mounted valve assembly and the externally mounted valve assembly. It is to be appreciated that other components may be utilized with the internally or externally mounted valve assembly 10X, such as, for example, components that couple the valve assembly 10X to various components outside of the tank.

The valve assembly 10X described herein may operate as a fill limit vent valve (FLVV). The valve assembly 10X vent vapors during various events. For example, the valve assembly 10X may operate during refueling of the tank. Therefore, the FLVV may operate during the refueling of the tank.

Generally, the valve assembly 10X may allow vapors that build up in the tank to be vented out of the tank to a vapor control structure 12X. The vapor control structure 12X may store the vapor received from the tank and may be periodically purged. Therefore, under certain conditions, the vapors move or flow from the tank through the valve assembly 10X and into the vapor control structure 12X. It is to be appreciated that the vapor control structure 12X may be referred to as a canister, such as a charcoal canister.

Figure 21:
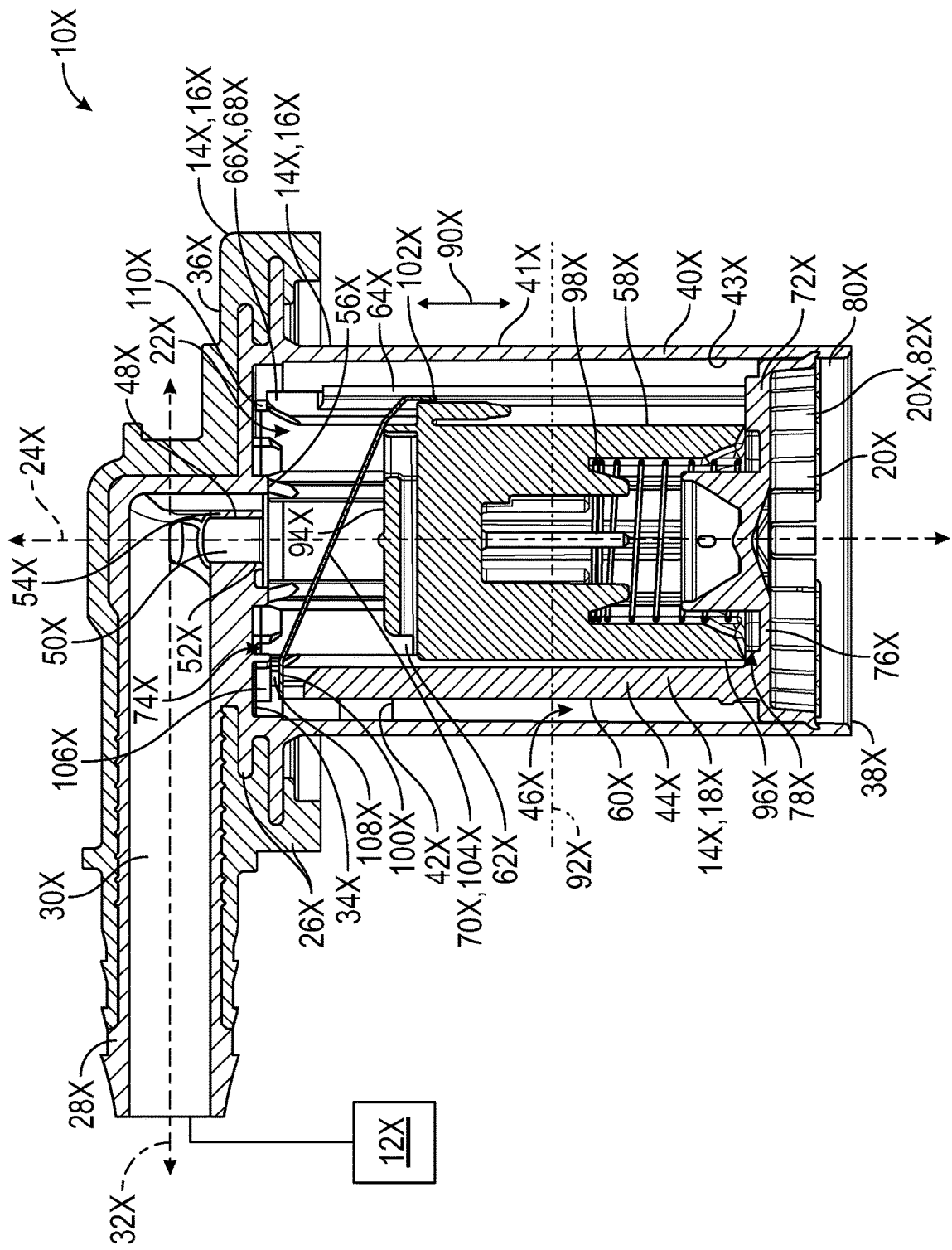
FIG. 21 is a schematic cross-sectional view of the valve assembly of FIG. 20.
Figure 22:
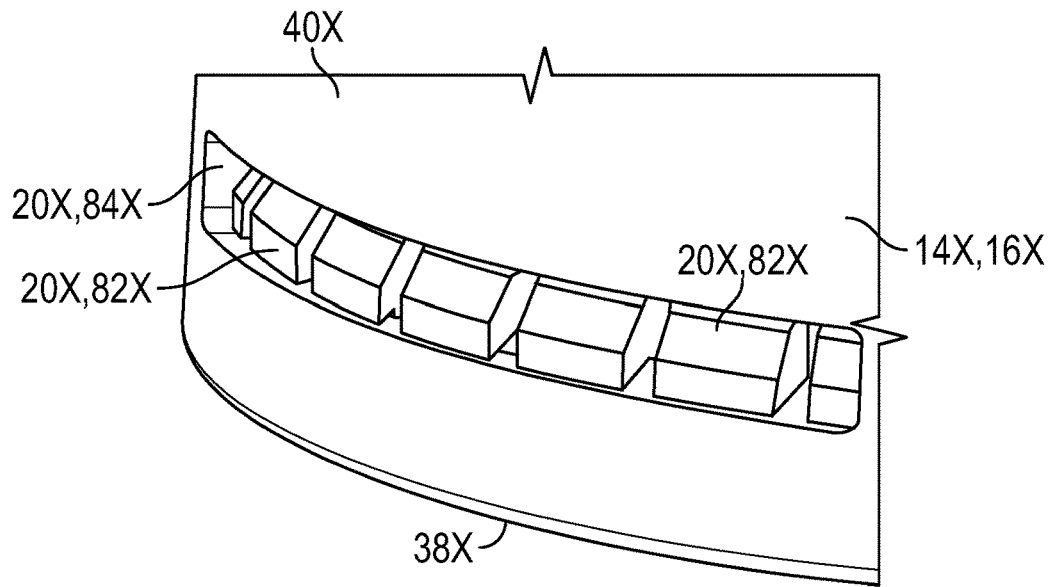
FIG. 22 is a schematic enlarged fragmentary perspective view of the first attachment configuration of FIG. 20.
Figure 26:
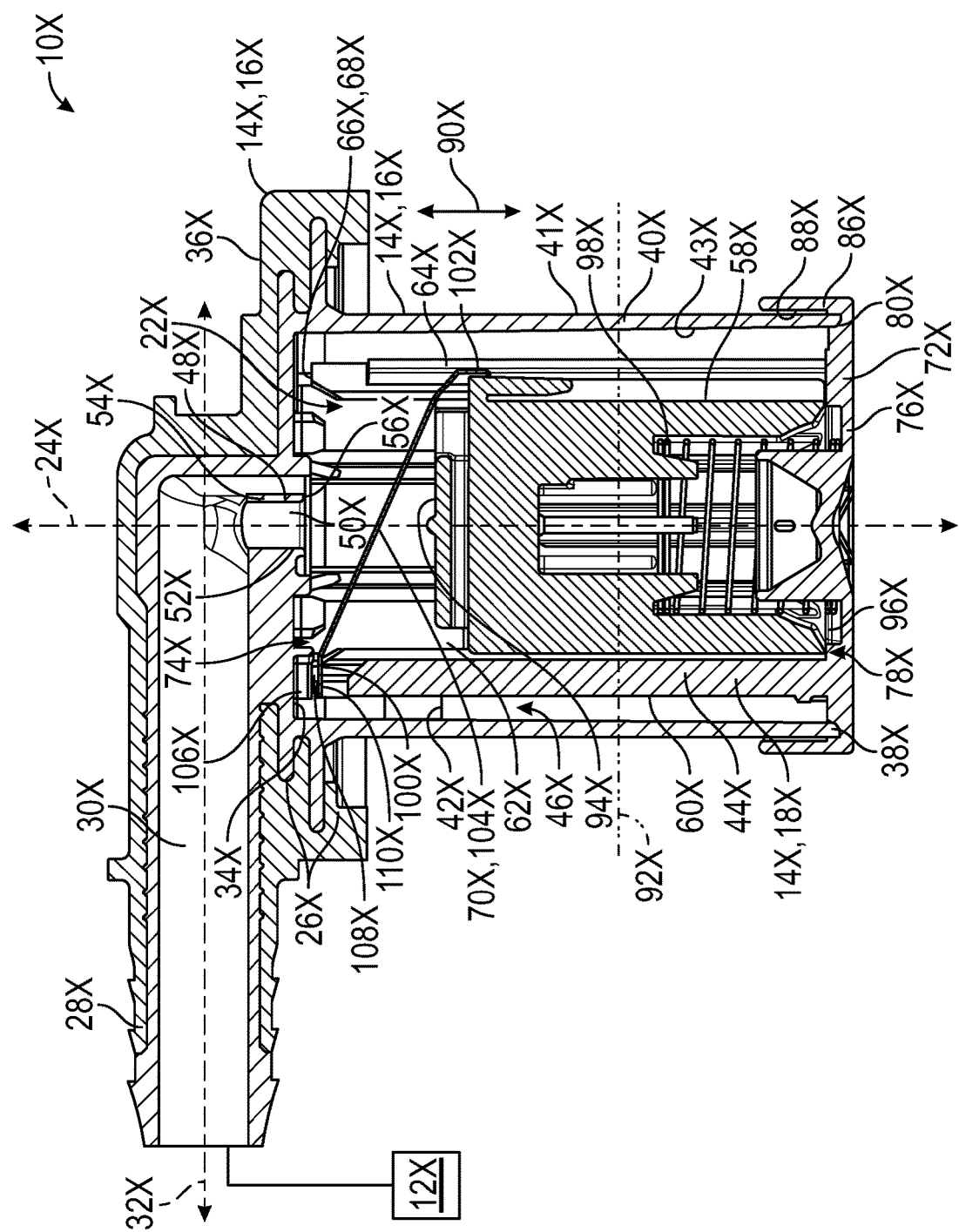
FIG. 26 is a schematic cross-sectional view of the valve assembly of FIG. 25.
Figure 27:
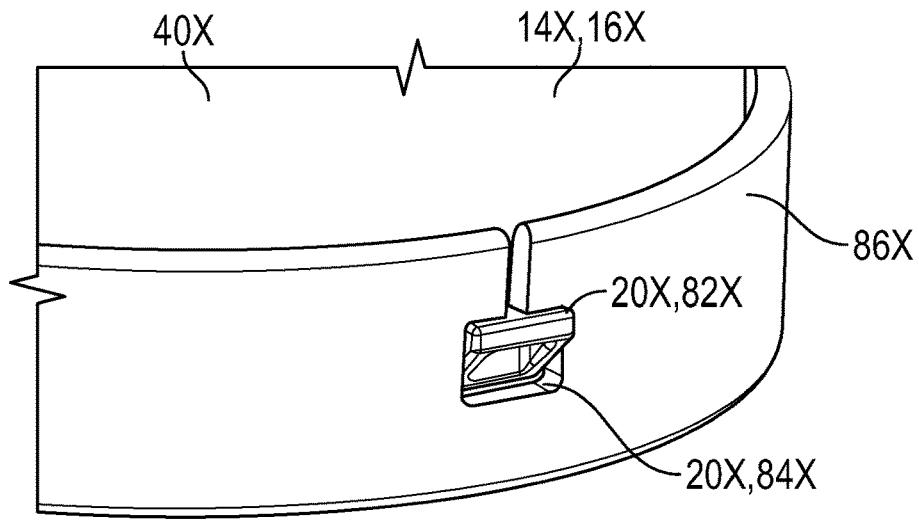
FIG. 27 is a schematic enlarged fragmentary perspective view of the second attachment configuration of FIG. 25.
Figure 28:
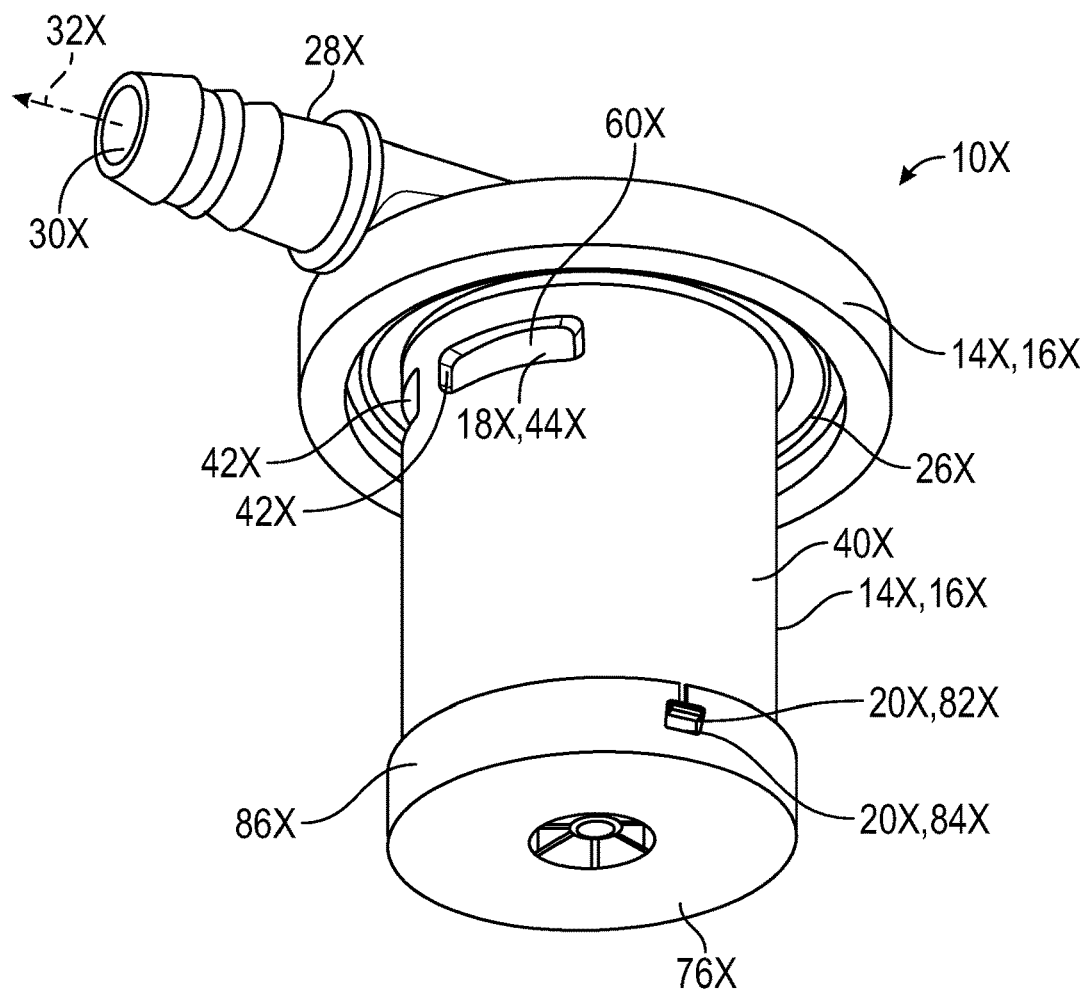
FIG. 28 is another schematic perspective view of the valve assembly of FIG. 25.
Figure 29:
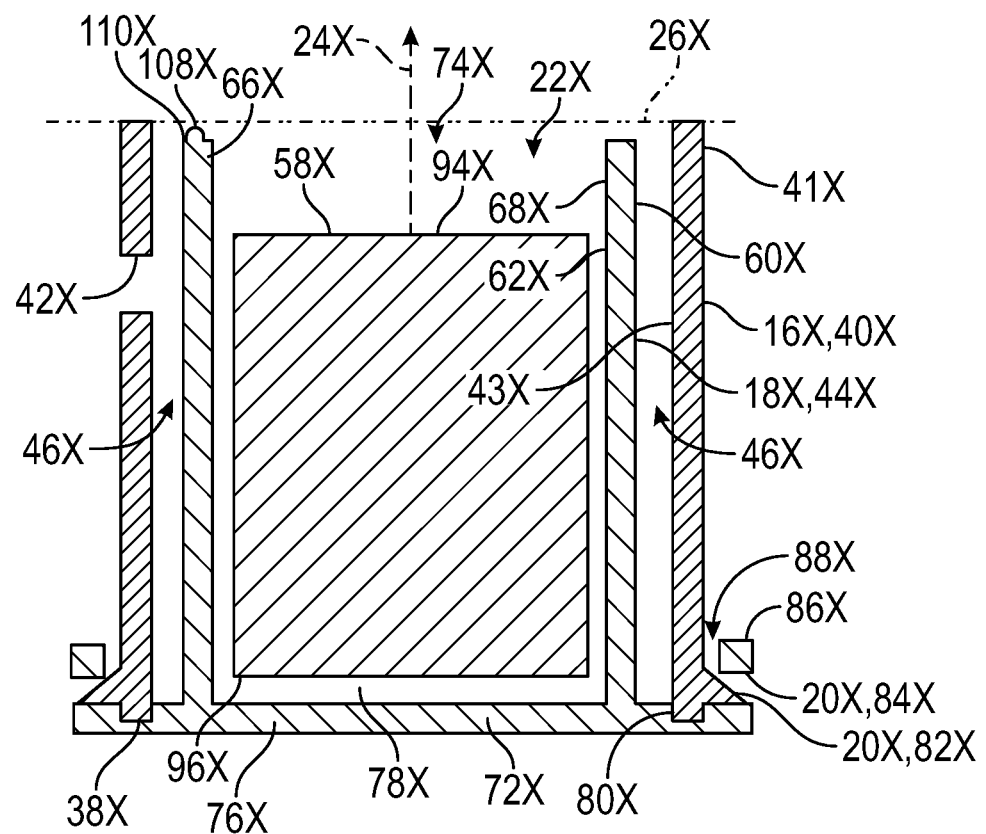
FIG. 29 is a schematic fragmentary cross-sectional view of the second attachment configuration of FIG. 25.

As best shown in FIGS. 20, 21, 25, and 26, the valve assembly 10X includes a housing 14X, and in certain configurations, the housing 14X is adapted to be attached to the tank. Simply stated, the housing 14X is attached or mounted to the tank either internally or externally as discussed above. As best shown in FIGS. 21 and 26, the housing 14X includes a first body portion 16X and a second body portion 18X attached to the first body portion 16X. That is, the first body portion 16X and the second body portion 18X are separate pieces attached to each other. In certain configurations, the first body portion 16X and the second body portion 18X may each include a fastening feature 20X (as best shown in FIGS. 22, 23, 27, and 28) cooperating with each other to attach together the first body portion 16X and the second body portion 18X, which will be discussed further below.

Referring to FIGS. 21 and 26, the first body portion 16X and the second body portion 18X cooperate to enclose a cavity 22X, which is discussed further below. In certain configurations, the cavity 22X may be disposed along a longitudinal axis 24X. For the externally mounted valve assembly, at least part of the first body portion 16X of the housing 14X is disposed outside of the tank and the second body portion 18X of the housing 14X is disposed inside of the tank.

Referring to FIGS. 20, 21, 25, and 26, the first body portion 16X includes a cap 26X having a nozzle 28X extending from the cap 26X. The nozzle 28X defines an outlet and in certain configurations, at least a portion of the outlet 30X is disposed along a first axis 32X. Generally, the cap 26X (of the first body portion 16X) may include a first wall 34X that faces the cavity 22X and a second wall 36X that opposes the first wall 34X. The nozzle 28X may extend outwardly from the second wall 36X. The outlet 30X of the nozzle 28X is coupled to the vapor control structure 12X. For example, the nozzle 28X may be connected to a tube that is coupled to the vapor control structure 12X, such that the outlet vents to the vapor control structure 12X. That is, the outlet 30X guides the vapors out of the valve assembly 10X toward the vapor control structure 12X. Therefore, generally, the vapors vented out of the tank move or flow out of the housing 14X through the outlet 30X and to the vapor control structure 12X.

Referring to FIGS. 21 and 26, generally, the first body portion 16X extends to a distal end 38X spaced from the cap 26X away from the nozzle 28X. More specifically, the first body portion 16X includes a first side wall 40X extending outwardly from the cap 26X. In certain configurations, the first side wall 40X may include the distal end 38X, and thus, the first side wall 40X may extend to the distal end 38X.

The first side wall 40X has an exterior surface 41X that defines an outside of the housing and has an interior surface 43X opposing the exterior surface 41X (see FIGS. 20, 21, and 26). The first side wall 40X defines a window 42X through the exterior surface 41X and the interior surface 43X. Therefore, the window 42X is in direct fluid communication with the outside of the housing 14X and an inside of the housing 14X. For example, liquid fluid (such as fuel) or gaseous fluid (such as vapors) may enter the cavity 22X via the window 42X. It is to be appreciated that the first side wall 40X may define a plurality of windows 42X in certain configurations.

Continuing with FIGS. 21 and 26, the second body portion 18X includes a second side wall 44X. Generally, the first and second side walls 40X, 44X surround the longitudinal axis 24X, and the second side wall 44X is disposed inside of the first side wall 40X. The window 42X may be disposed in any suitable location along the first side wall 40X of the first body portion 16X, with the corresponding second side wall 44X overlapping the window 42X to act as the barrier. The second side wall 44X is elongated axially relative to the longitudinal axis 24X to extend across the window 42X. As discussed further below, by having the second side wall 44X extend across the window 42X, the second side wall 44X acts as a barrier when the liquid fluids enter the window 42X, for example, if the liquid fluids are sloshing around in the tank.

The second side wall 44X is spaced from the first side wall 40X to define a gap 46X that is unobstructed between the first side wall 40X and the second side wall 44X. The gap 46X is in direct fluid communication with the window 42X relative to the interior surface 43X of the housing 14X. Generally, the second side wall 44X is characterized by the absence of the window 42X. That is, the second side wall 44X does not define the window 42X of the first side wall 40X.

It is desirable to eliminate features between the first and second side walls 40X, 44X. Therefore, in certain configurations, the housing 14X may be characterized by the absence of a third wall disposed in the gap 46X between the first side wall 40X and the second side wall 44X such that the gap 46X is unobstructed between the first side wall 40X and the second side wall 44X. By eliminating the third wall between the first and second side walls 40X, 44X, material costs may be saved and/or a weight savings.

Again, continuing with FIGS. 21 and 26, the first body portion 16X includes a seat 48X defining an orifice 50X in fluid communication with the outlet 30X and the cavity 22X. Generally, the orifice 50X of the seat 48X is disposed between the cavity 22X and the outlet 30X. In certain configurations, the orifice 50X of the seat 48X may be in direct fluid communication with the outlet 30X of the nozzle 28X. Therefore, when vapors are being expelled to the vapor control structure 12X, the vapors exit the cavity 22X via the orifice 50X and through the outlet 30X. The orifice 50X may be disposed along the longitudinal axis 24X.

Continuing with FIGS. 21 and 26, generally, the seat 48X extends from the cap 26X. The seat 48X may be entirely disposed inside of the cavity 22X of the housing 14X or part of the seat 48X may be disposed inside of the cavity 22X and another part of the seat 48X may be disposed outside of the cavity 22X. Therefore, in certain configurations, the seat 48X extends from the cap 26X into the cavity 22X. More specifically, in certain configurations, the seat 48X may extend from the first wall 34X of the cap 26X into the cavity 22X.

In other configurations, the seat 48X extends through the cap 26X from both of the first and second walls 34X, 36X. In this configuration, the seat 48X may include a first seat body 52X that extends from the cap 26X into the cavity 22X, and a second seat body 54X that extends from the cap 26X outside of the cavity 22X. That is, the first seat body 52X extends into the cavity 22X from the first wall 34X, and the second seat body 54X extends outwardly away from the cavity 22X from the second wall 36X. For the configuration with the first and second seat bodies 52X, 54X, the orifice 50X is defined through both of the first and second seat bodies 52X, 54X. Also, for this configuration, the nozzle 28X may extend from the second seat body 54X.

Referring to FIGS. 21 and 26, the seat 48X may include a sealing face 56X disposed inside the cavity 22X. The sealing face 56X may be disposed at a distal end of the first seat body 52X. Other features of the valve assembly 10X selectively engage the sealing face 56X, which will be discussed further below.

As mentioned above, the first body portion 16X and the second body portion 18X cooperate to enclose the cavity 22X. Continuing with FIGS. 21 and 26, the valve assembly includes a float 58X disposed inside the cavity 22X. More specifically, the second side wall 44X of the second body portion 18X surrounds the float 58X. Therefore, the second side wall 44X is disposed between the float 58X and the first side wall 40X.

The second side wall 44X may include an outer surface 60X that faces outwardly toward the first side wall 40X and an inner surface 62X opposing outer surface 60X and facing inwardly toward the float 58X. The inner surface 62X defines a boundary of the cavity 22X and the float 58X is disposed inside of the inner surface 62X. The gap 46X is spaced from the inner surface 62X of the second side wall 44X. That is, the gap 46X is disposed between the first side wall 40X and the outer surface 60X of the second side wall 44X.

Optionally, the second side wall 44X may include a guide 64X that engages the float 58X to minimize rotation of the float 58X around the longitudinal axis 24X. More specifically, the inner surface 62X of the second side wall 44X may include the guide 64X that engages the float 58X to minimize rotation of the float 58X about the longitudinal axis 24X.

As best shown in FIGS. 21 and 26, the second side wall 44X extends toward the cap 26X such that the first side wall 40X and the second side wall 44X overlap. The second side wall 44X extends across the window 42X to obstruct direct fluid communication between the window 42X and the float 58X. Therefore, the second side wall 44X acts as a barrier to prevent the liquid fluid from directly engaging the float 58X from the window 42X. For example, if the liquid fluid is sloshing around in the tank, the liquid fluid may enter the window 42X due to the sloshing of the liquid fluid, the sloshed liquid fluid will engage the second side wall 44X (and more specifically, the outer surface 60X of the second side wall 44X) to break the sloshing before the liquid fluid reaches the float 58X. Therefore, the second side wall 44X acts as a barrier for the float 58X to prevent direct contact with the float 58X due to the sloshing liquid fluid. In certain configurations, the second side wall 44X may be referred to as a slosh wall or barrier wall.

Generally, the second body portion 18X may include a first end 66X defining an opening 68X. The seat 48X faces the opening 68X and part of a seal 70X is movable across the opening 68X as the float 58X moves between the initial position and the displaced position. The second side wall 44X may surround the opening 68X at the first end 66X.

Furthermore, the second body portion 18X may include a second end 72X spaced from the first end 66X. The second side wall 44X extends between the first end 66X and the second end 72X of the second body portion 18X. As discussed further below, the second end 72X of the second body portion 18X is closed.

Generally, the cap 26X closes a first distal end 74X of the cavity 22X (see FIGS. 21 and 26), and thus, prevents the float 58X from exiting the housing 14X via the cap 26X. Furthermore, the second body portion 18X may include a base wall 76X that closes a second distal end 78X of the cavity 22X. More specifically, the second end 72X of the second body portion 18X may include the base wall 76X to close the cavity 22X. The first side wall 40X may extend to the base wall 76X, and therefore, the first side wall 40X may be elongated. For example, in certain configurations, the window 42X is disposed closer to the cap 26X than to the base wall 76X of the second body portion 18X.

The float 58X is disposed between the cap 26X and the base wall 76X. That is, the base wall 76X closes a bottom of the cavity 22X, and thus prevents the float 58X from exiting the housing 14X via the base wall 76X. The second side wall 44X of the second body portion 18X and the base wall 76X may cooperate to close the cavity 22X except at the first end 66X. That is, the second side wall 44X may extend from the base wall 76X toward the cap 26X. The first end 66X of the second body portion 18X is open to allow various internal components, to be disposed in the cavity 22X during an assembly process. The first end 66X of the second body portion 18X is closed via the first body portion 16X.

Furthermore, one end of the first body portion 16X is open to allow assembly of the second body portion 18X to the first body portion 16X. That is, one end of the first body portion 16X is open to receive the second side wall 44X and the various internal components. More specifically, the distal end 38X of the first body portion 16X may define an access hole 80X. The access hole 80X may be disposed along the longitudinal axis 24X. The second body portion 18X may be disposed through the access hole 80X, and thus, the second body portion 18X is housed inside of the first body portion 16X. In certain configurations, the base wall 76X of the second body portion 18X closes the access hole 80X and closes an end of the gap 46X.

Generally, as best shown in FIGS. 22-24 and 27-29, the first body portion 16X and the second body portion 18X may be attached to each other via the fastening feature 20X as mentioned above. The fastening feature 20X may be various configurations and locations as shown in the figures (compare FIGS. 23, 24, and 28). Non-limiting examples of the fastening feature 20X may include tabs, fasteners 82X, clips, fingers, ramps, latches, snaps, grooves, slots, apertures, hollows 84X, etc., some of which are discussed further below.

Referring to FIGS. 21, 23, 26, 28, and 29, in certain configurations, the base wall 76X and the first side wall 40X may each include the fastening feature 20X that engage each other to attach together the first body portion 16X and the second body portion 18X. As one non-limiting example, see FIGS. 20-23, the fastening feature 20X of the base wall 76X may include a fastener 82X, and the fastening feature 20X of the first side wall 40X may define a hollow 84X. The fastener 82X is at least partially disposed in the hollow 84X to attach together the first body portion 16X and the second body portion 18X. In other configurations, the fastening features 20X may be reversed; that is, the fastening feature 20X of the base wall 76X may define the hollow 84X, and the fastening feature 20X of the first side wall 40X may include the fastener 82X.

Figure 23:
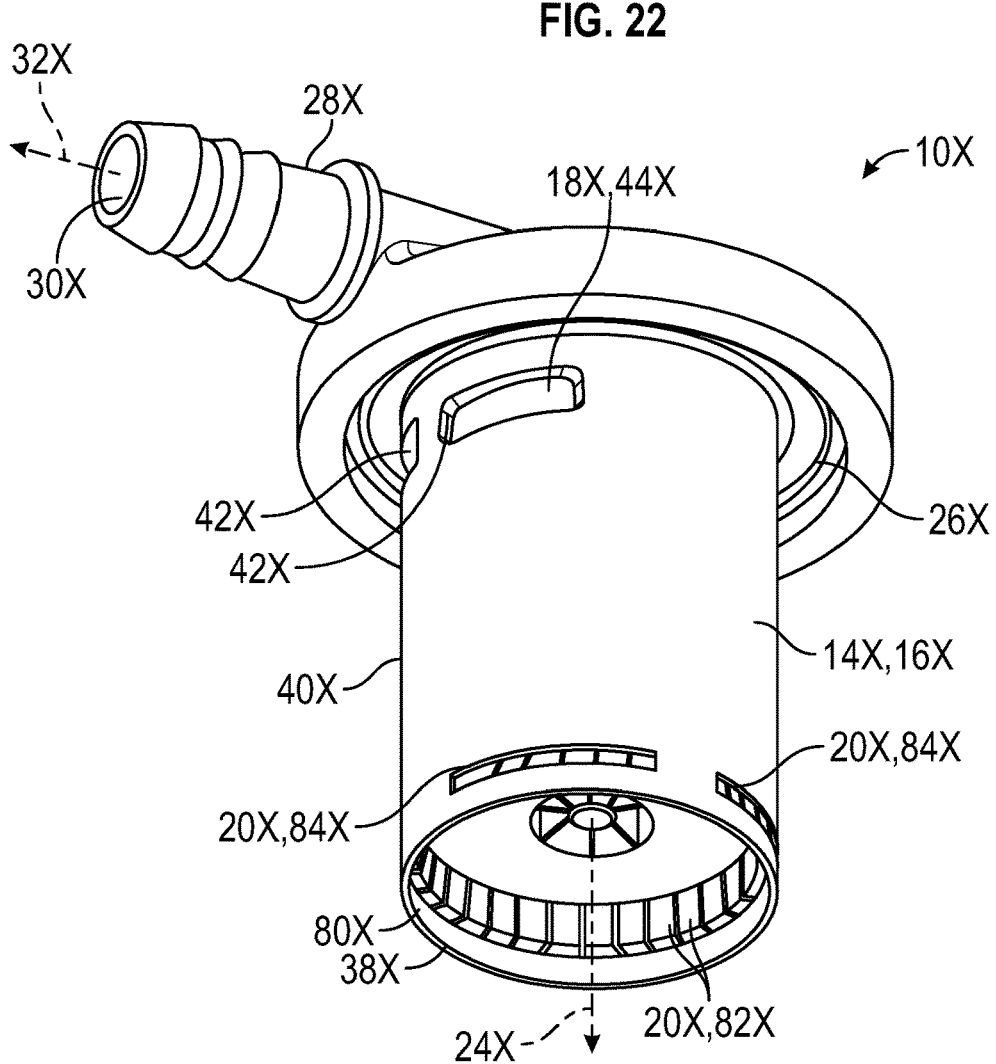
FIG. 23 is another schematic perspective view of the valve assembly of FIG. 20.
Figure 24:
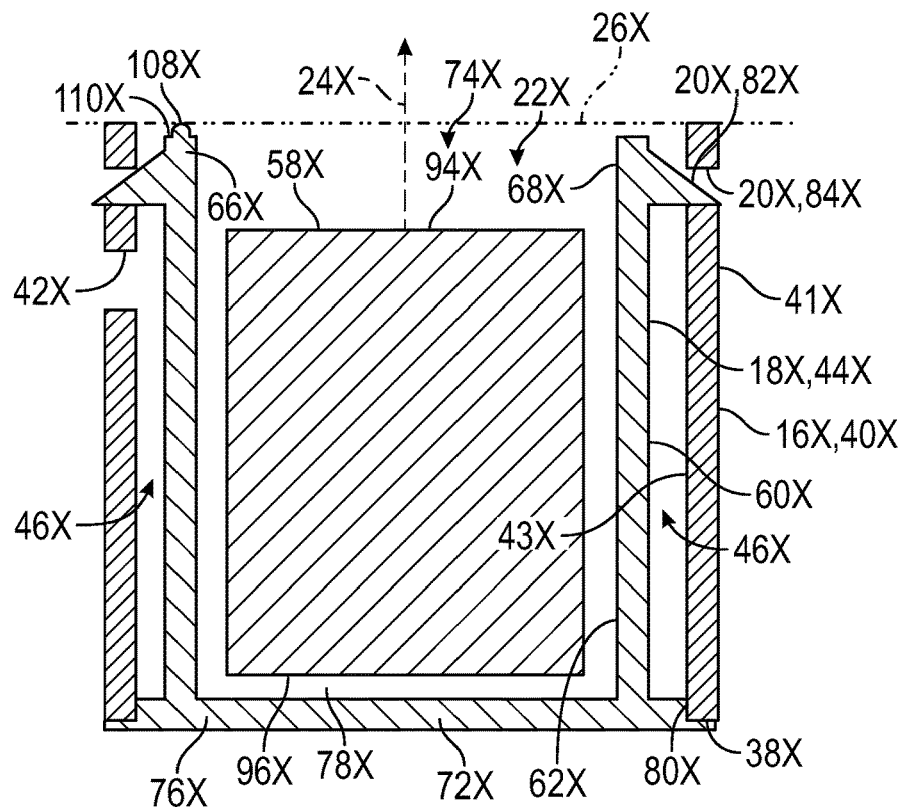
FIG. 24 is a schematic fragmentary cross-sectional view of another location of the first attachment configuration of FIG. 20, with the first attachment configuration located closer to a cap in FIG. 24 as compared to the location of the first attachment configuration closer to a bottom in FIG. 20.

Turning to FIG. 24, in certain configurations, the location of the fastener 82X and the hollow 84X may be different than FIG. 23. That is, the second side wall 44X may include the fastener 82X and the first side wall 40X may define the hollow 84X. The hollow 84X and the fastener 82X may be disposed closer to the cap 26X than to the base wall 76X. The hollow 84X and the fastener 82X may engage each other as similarly discussed in the paragraph immediately above.

Turning to FIGS. 25-29, the base wall 76X may include a flange 86X that extends outwardly across the first side wall 40X to define a slot 88X. When the first and second body portions 16X, 18X are attached to each other, the distal end 38X of the first side wall 40X may be disposed in the slot 88X. In this non-limiting example, the fastening feature 20X of the first side wall 40X includes the fastener 82X, and the fastening feature 20X of the base wall 76X defines the hollow 84X. In certain configurations, the flange 86X of the base wall 76X may define the hollow 84X. The fastener 82X is at least partially disposed in the hollow 84X to attach together the first body portion 16X and the second body portion 18X.

Furthermore, in certain configurations, the fastener 82X may be further defined as a plurality of fasteners 82X, and the hollow 84X may be further defined as a plurality of hollows 84X. In this configuration, at least one of the plurality of fasteners 82X is disposed in each of the plurality of hollows 84X. For the configuration of FIGS. 21-23, more than one of the fasteners 82X are disposed in each of the hollows 84X. In the configuration of FIGS. 25-29, one fastener 82X is disposed in each of the hollows 84X. For the configuration of FIG. 24, one fastener 82X or the plurality of fasteners 82X may be disposed in each of the hollows 84X. Generally, the fasteners 82X surround the longitudinal axis 24X and in certain configurations, the fasteners 82X may oppose each other. Also, as best shown in FIG. 21, the fasteners 82X may completely surround the longitudinal axis 24X around the base wall 76X.

The float 58X is movable axially or along the longitudinal axis 24X, as generally illustrated via the arrow 90X, in FIGS. 21 and 26. More specifically, the float 58X is movable between an initial position (shown in FIGS. 21 and 26) and a displaced position. In certain configurations, the float 58X is movable axially relative to the longitudinal axis 24X between the initial position and the displaced position. Therefore, the float 58X is movable inside of the cavity 22X between the initial position and the displaced position. The float 58X is movable inside of the second side wall 44X. Hence, the second side wall 44X acts as a barrier for the float 58X.

Generally, the initial position of the float 58X is when the float 58X is positioned away from or moves away from the seat 48X to allow fluid communication through the orifice 50X of the seat 48X, and the displaced position of the float 58X is when the float 58X is positioned toward or moves toward the seat 48X to prevent fluid communication through the orifice 50X of the seat 48X. Therefore, the valve assembly 10X is configured to vent the vapors out of the outlet 30X during certain events, such as refueling of the tank, when the float 58X is in the initial position. Furthermore, when the float 58X is in the displaced position, vapors are not vented out of the outlet 30X via the nozzle 28X.

The float 58X is movable between the initial position and the displaced position relative to the housing 14X in response to a liquid fluid level 92X inside the tank. Liquid fluid may enter the housing 14X through the window(s) 42X around the housing 14X, and thus, the liquid fluid may at least partially fill the cavity 22X by entering the windows 42X, and at least partially fill the gap 46X. It is to be appreciated that the window(s) 42X of FIGS. 21, 23-25, 26, 28, and 29 may be any suitable location and configuration.

When the float 58X is combined with a biasing force, which is discussed further below, the float 58X is buoyant in the liquid fluid, such as the fuel, inside of the cavity 22X. Thus, the float 58X may move axially relative to the longitudinal axis 24X depending on the liquid fluid level 92X of the fuel inside the tank. For example, if the liquid fluid level 92X rises, the float 58X moves toward the seat 48X and toward the displaced position. As another example, if the liquid fluid level 92X descends, the float 58X moves away from the seat 48X and toward the initial position.

Referring to FIGS. 21 and 26, the float 58X may include a first float end 94X and a second float end 96X spaced from each other relative to the longitudinal axis 24X. The valve assembly 10X may also include a biasing member 98X disposed in the cavity 22X between the float 58X and the base wall 76X. More specifically, the biasing member 98X may engage the second float end 96X of the float 58X and the base wall 76X to continuously bias the float 58X toward the seat 48X. In other words, the biasing member 98X applies the biasing force to the float 58X. The base wall 76X provides a surface for the biasing member 98X to react against. This biasing force overcomes the weight of the float 58X. It is to be appreciated that in a roll-over situation, the float 58X will move to the displaced position without the buoyancy of the float 58X affecting the float's position due to the biasing force applied to the float 58X overcoming the buoyancy of the float 58X, the weight of the float 58X, etc. Therefore, when in the roll-over situation, the biasing member 98X assists in maintaining the float 58X in the displaced position. In certain configurations, the biasing member 98X may be a spring, such as a coil spring. It is to be appreciated that the biasing member 98X may be any suitable configuration to continuously bias the float 58X toward the seat 48X.

Referring to FIGS. 21 and 26, the valve assembly 10X also includes the seal 70X secured to the housing 14X and the float 58X. In other words, the seal 70X is anchored to the float 58X and the housing 14X. Due to the way the seal 70X is anchored to the housing 14X and the float 58X, the seal 70X extends between the float 58X and the seat 48X. More specifically, the seal 70X extends across the first float end 94X of the float 58X such that at least a portion of seal 70X overlaps at least a portion of the float 58X. Furthermore, at least a portion of the seal 70X overlaps the seat 48X. As such, during movement of the float 58X between the initial position and the displaced position, at least part of the seal 70X moves with the float 58X. Generally, the seal 70X selectively engages the seat 48X depending on the position of the float 58X to either allow or prevent venting out the outlet 30X, as discussed further below. Furthermore, generally, the sealing face 56X of the seat 48X faces the seal 70X. The seal 70X engages the sealing face 56X when the float 58X is in the displaced position.

The seal 70X is disposed between the float 58X and the seat 48X to selectively engage the seat 48X depending on the position of the float 58X. For example, the seal 70X is spaced from the seat 48X when the float 58X is in the initial position and the seal 70X engages the seat 48X when the float 58X is in the displaced position. Therefore, the seal 70X is spaced from the seat 48X when the float 58X is in the initial position to allow fluid communication between the cavity 22X, the orifice 50X, and the outlet 30X. That is, the seal is spaced from the seat 48X when the float 58X is in the initial position to allow fluid communication through the orifice 50X and out of the outlet 30X. In certain configurations, the orifice 50X of the seat 48X may be in direct fluid communication with the cavity 22X when the float 58X is in the initial position. The seal 70X engages the seat 48X when the float 58X is in the displaced position to prevent fluid communication between the cavity 22X and the orifice 50X. That is, the seal 70X engages the seat 48X when the float 58X is in the displaced position to prevent fluid communication through the orifice 50X and out of the outlet 30X.

Continuing with FIGS. 21 and 26, the seal 70X may include a first seal end 100X and a second seal end 102X spaced from the first seal end 100X. The first seal end 100X of the seal 70X may be secured to the housing 14X and the second seal end 102X of the seal may be secured to the float 58X. In certain configurations, the seal 70X may include an engagement portion 104X disposed between the first seal end 100X and the second seal end 102X. The seal 70X engages the seat 48X between the first seal end 100X and the second seal end 102X of the seal 70X when the float 58X is in the displaced position. More specifically, the engagement portion 104X engages the seat 48X when the float 58X is in the displaced position, and therefore, prevents fluid communication from the cavity 22X through the orifice 50X. In certain configurations, the engagement portion 104X of the seal 70X engages the sealing face 56X of the seat 48X when the float 58X is in the displaced position.

The seal 70X and engagement portion 104X for FIGS. 20-29 may be configured as discussed above for the seal 76 and engagement portion 82 of the figures of the other configuration (FIGS. 1-19), and some of the features will be briefly re-discussed below. As best shown in FIGS. 1 and 3, the seal 76, 70X may be thinner (thickness T; labeled in FIGS. 5 and 6) than a length L (labeled in FIG. 4) of the seal 76, 70X. Furthermore, the seal 76, may narrow at the second seal end 102X/the second end 80 of the seal 76 (see FIG. 5). Generally, this type of configuration of the seal 76, 70X may be referred to as a ribbon seal 76, 70X.

The seal 76, 70X may be formed of a flexible material. The flexible material is capable of being bent and/or stretched without permanent deformation. As a non-limiting example, the seal 76, 70X may be formed of an elastomeric material. One non-limiting example of the elastomeric material of the seal 76, 70X includes fluorosilicone, etc. Next, the features to anchor the first seal end 100X of the seal 76, 70X to the housing 14X are discussed with reference to FIGS. 1, 3, 4, 6, 7, 10, and 11, which are also applicable to FIGS. 20-29. In certain configurations, the first seal end 100X of the seal 76, may define a hole 84 (as best shown in FIG. 4). In other configurations, the first seal end 100X of the seal 76, 70X may define more than one hole 84. Therefore, optionally, the hole 84 of the first seal end 100X of the seal 76, 70X is further defined as a plurality of holes 84. When using more than one hole 84, the holes 84 are spaced from each other. The hole(s) 84 are used to secure the first seal end 100X of the seal 76, 70X to the housing 14X. The configuration of the seal 76, 70X of FIGS. 4 and 5 are suitable for any configurations discussed herein.

Generally, the first body portion 16X of the housing 14X may include a column 86, 106X (see FIGS. 1, 3, 6, 7, 10, 21 and 26) disposed inside the cavity 22X, and is spaced from the seat 48X. Furthermore, the first seal end 100X of the seal 76, 70X is secured to the column 86, 106X. In certain configurations, the column 86, 106X may extend from the first wall 34X. As such, the first wall 34X of the cap 26X may include the column 86, 106X that extends into the cavity 22X and is spaced from the seat 48X. The first seal end 100X of the seal 76, 70X may be secured to the column 86, 106X. The features of the column 86, 106X discussed above for the valve configuration of FIGS. 1, 3, 6, 7, and 10 are also applicable to the configurations of FIGS. 20-29.

Optionally, the first body portion 16X may include more than one column 86, 106X. Therefore, in certain configurations, the column 86, 106X is further defined as a plurality of columns 86, 106X, and the columns 86, 106X may be disposed inside of the cavity 22X. The columns 86, 106X may be spaced from each other, and spaced from the seat 48X. Each of the columns 86, 106X may extend from the first wall 34X of the cap 26X into the cavity 22X. When using the plurality of columns 86, 106X, the first seal end 100X of the seal 76, 70X defines the plurality of holes 84, with one of the holes 84 cooperating with one of the columns 86, 106X, and another one of the holes 84 cooperating with another one of the columns 86, 106X.

Furthermore, as best shown in FIGS. 7 and 10, the column 86, 106X may define a pocket 88 open to the cavity 22X. In certain configurations, the columns 86, 106X may each define the pocket 88 open to the cavity 22X. That is, the pocket 88 may be further defined as a plurality of pockets 88, and in this configuration, one of the pockets 88 may be defined in each of the columns 86, 106X, and the pockets 88 are open to the cavity 22X. Again, this feature of the column 86, 106X, i.e., the pocket 88, is also applicable to the configurations of FIGS. 20-29.

Generally, the first seal end 100X of the seal 76, 70X is secured to a portion of the second body portion 18X, and the portion of the second body portion 18X is disposed in the pocket 88 of the column 86, 106X to secure the seal 76, 70X to the housing 14X. In certain configurations, the portion of the second body portion 18X is disposed in the pocket 88 of each of the columns 86, 106X to secure the seal 76, 70X to the housing 14X. More specifically, as best shown in FIGS. 4, 21 and 26, the second body portion 18X may include a post 90, 108X, and in certain configurations, the portion of the second body portion 18X is further defined as the post 90, 108X. Furthermore, in certain configurations, the post 90, 108X extends from the second side wall 44X of the second body portion 18X. More specifically, in certain configurations, the second side wall 44X may include a first edge 110X that faces the first wall 34X of the cap 26X, and the post 90, 108X extends from the first edge 110X of the second side wall 44X.

Generally, the first seal end 100X of the seal 76, 70X is attached to the post 90, 108X of the second body portion 18X, and the second seal end 102X of the seal 76, 70X is attached to the float 58X. The post 90, 108X may be disposed through the hole 84 of the first seal end 100X of the seal 76, 70X and into the pocket 88 to secure the first seal end 100X of the seal 76, 70X to the housing 14X. In certain configurations, the cap 26X may include the column 86, 106X that faces the post 90, 108X, and the post 90, 108X is disposed in the column 86, 106X.

In certain configurations, the post 90, 108X of the second body portion 18X is further defined as a plurality of posts 90, 108X. In this configuration, each of the posts 90, 108X is disposed through a respective one of the holes 84 of the first seal end 100X of the seal 76, 70X and the posts 90, 108X are disposed into the pocket 88 of the respective columns 86, 106X to secure the first seal end 100X of the seal 76, 70X to the housing 14X.

Various features may be formed together as one piece, which reduces the number of separate pieces for the valve assembly 10X, and thus, may reduce assembly time and/or save costs. For example, the second side wall 44X and the base wall 76X may be formed together as one piece. That is, the second side wall 44X and the base wall 76X are integral with each other to form a one-piece component. Furthermore, the cap 26X and the first side wall 40X may be formed together as one piece. That is, the cap 26X and the first side wall are integral with each other to form a one-piece component. In addition, the cap 26X and the column 106X may be formed together as one piece. That is, the cap 26X and the column 106X are integral with each other to form a one-piece component. Also, the second side wall 44X and the post 108X may be formed together as one piece. That is, the second side wall 44X and the post 108X are integral with each other to form a one-piece component. Therefore, assembly of the first and second body portion 16X, 18X, may be easier and quicker due to the reduction of individual pieces to assemble together.

The following Clauses provide some example configurations of the valve assemblies, and the methods as disclosed herein.

Clause 1: A valve assembly comprising: a housing including a first body portion and a second body portion attached to the first body portion, with the first body portion and the second body portion cooperating to enclose a cavity; wherein the first body portion includes a cap having a nozzle extending from the cap, and the nozzle defines an outlet; wherein the first body portion includes a seat defining an orifice in fluid communication with the outlet and the cavity; a float disposed inside the cavity and movable between an initial position and a displaced position; a seal secured to the housing and the float, and the seal is spaced from the seat when the float is in the initial position and the seal engages the seat when the float is in the displaced position; and wherein the cap, the nozzle, and the seat are formed together as one piece.

Clause 2: The valve assembly as set forth in clause 1 wherein the seat extends from the cap into the cavity.

Clause 3: The valve assembly as set forth in clause 1 wherein the orifice of the seat is disposed between the cavity and the outlet.

Clause 4: The valve assembly as set forth in clause 1 wherein: the seat includes a sealing face disposed inside the cavity and the sealing face faces the seal; and the seal engages the sealing face when the float is in the displaced position.

Clause 5: The valve assembly as set forth in clause 1 wherein: the cap includes a first wall facing the cavity and a second wall opposing the first wall; and the seat extends from the first wall into the cavity.

Clause 6: The valve assembly as set forth in clause 1 wherein the seal includes a first end secured to the housing and a second end secured to the float.

Clause 7: The valve assembly as set forth in clause 6 wherein: the cap includes a first wall facing the cavity and a second wall opposing the first wall; the first wall includes a column extending into the cavity and spaced from the seat; and the first end of the seal is secured to the column.

Clause 8: The valve assembly as set forth in clause 6 wherein the first body portion includes a column disposed inside the cavity, and the first end of the seal is secured to the column.

Clause 9: The valve assembly as set forth in clause 8 wherein the column and the cap are formed together as one piece.

Clause 10: The valve assembly as set forth in clause 8 wherein the column is further defined as a plurality of columns disposed inside of the cavity.

Clause 11: The valve assembly as set forth in clause 10 wherein the columns each define a pocket open to the cavity, and the first end of the seal is secured to a portion of the second body portion and the portion of the second body portion is disposed in the pocket of each of the columns to secure the seal to the housing.

Clause 12: The valve assembly as set forth in clause 8 wherein: the second body portion includes a post; the first end of the seal defines a hole; the column defines a pocket open to the cavity; and the post is disposed through the hole of the first end of the seal and into the pocket to secure the first end of the seal to the housing.

Clause 13: The valve assembly as set forth in clause 12 wherein: the post of the second body portion is further defined as a plurality of posts; the hole of the first end of the seal is further defined as a plurality of holes; the column is further defined as a plurality of columns; the pocket is further defined as a plurality of pockets, with one of the pockets defined in each of the columns that are open to the cavity; and each of the posts is disposed through a respective one of the holes of the first end of the seal and into the pocket of the respective columns to secure the first end of the seal to the housing.

Clause 14: The valve assembly as set forth in clause 6 wherein the seal includes an engagement portion disposed between the first end and the second end, and wherein the engagement portion engages the seat when the float is in the displaced position.

Clause 15: The valve assembly as set forth in clause 14 wherein: the seat includes a sealing face disposed inside the cavity and the sealing face faces the seal; the seat includes an insert disposed inside of the orifice adjacent to the sealing face to prevent the engagement portion of the seal from entering the orifice beyond the insert; and the insert defines at least one opening to allow fluid communication between the cavity and the orifice when the float is in the initial position.

Clause 16: The valve assembly as set forth in clause 15 wherein the insert and the seat are formed as one piece.

Clause 17: The valve assembly as set forth in clause 1 wherein: the outlet of the nozzle includes an inner diameter; the orifice of the seat includes an inner diameter; and the inner diameter of the outlet is greater than the inner diameter of the orifice.

Clause 18: The valve assembly as set forth in clause 1 wherein: the seat includes an inner wall that surrounds the orifice; the nozzle includes an inner wall that surrounds the outlet; the inner wall of the seat defines an elliptical configuration to present a first inner diameter of the orifice and a second inner diameter of the orifice; the first inner diameter is less than the second inner diameter; and the inner wall of the nozzle defines a circular configuration which presents an inner diameter greater than the first inner diameter of the inner wall of the seat.

Clause 19: A method of forming a valve assembly, the method comprising: attaching together a first core and a second core to form a sub-core; positioning the sub-core inside a mold; forming a first body portion of a housing inside the mold to present a cap, a nozzle formed around the first core, and a seat formed around the second core; removing the first core from the first body portion to present an outlet of the nozzle; removing the second core from the first body portion to present an orifice of the seat; and wherein the cap, the nozzle, and the seat are formed as one piece when forming the first body portion.

Clause 20: The method as set forth in clause 19 wherein forming the first body portion is further defined as molding the first body portion of the housing inside of the mold to form the cap, the nozzle, and the seat as one piece.

Clause 21: A valve assembly comprising: a housing including a first body portion and a second body portion attached to the first body portion, with the first body portion and the second body portion cooperating to enclose a cavity; wherein the first body portion includes a cap having a nozzle extending from the cap, and the nozzle defines an outlet; wherein the first body portion includes a first side wall extending outwardly from the cap away from the nozzle, and the first side wall has an exterior surface that defines an outside of the housing and has an interior surface opposing the exterior surface; wherein the first side wall defines a window through the exterior surface and the interior surface; wherein the first body portion includes a seat defining an orifice in fluid communication with the outlet and the cavity; a float disposed inside the cavity and movable between an initial position and a displaced position; a seal secured to the housing and the float, and the seal is spaced from the seat when the float is in the initial position to allow fluid communication through the orifice and out of the outlet, and the seal engages the seat when the float is in the displaced position to prevent fluid communication through the orifice and out of the outlet; wherein the second body portion includes a second side wall that surrounds the float, and the second side wall extends toward the cap such that the first side wall and the second side wall overlap, and the second side wall extends across the window to obstruct direct fluid communication between the window and the float; and wherein the second side wall is spaced from the first side wall to define a gap that is unobstructed between the first side wall and the second side wall, and the gap is in direct fluid communication with the window relative to the interior surface of the housing.

Clause 22: The valve assembly as set forth in clause 21 wherein the cap closes a first distal end of the cavity and the second body portion includes a base wall that closes a second distal end of the cavity, and wherein the float is disposed between the cap and the base wall.

Clause 23: The valve assembly as set forth in clause 22 wherein the second side wall and the base wall are formed together as one piece.

Clause 24: The valve assembly as set forth in clause 23 wherein the cap and the first side wall are formed together as one piece.

Clause 25: The valve assembly as set forth in clause 24 wherein the first body portion and the second body portion are separate pieces attached to each other.

Clause 26: The valve assembly as set forth in clause 25 wherein the first body portion and the second body portion each include a fastening feature cooperating with each other to attach together the first body portion and the second body portion.

Clause 27: The valve assembly as set forth in clause 22 wherein: the float is movable axially along a longitudinal axis; the second side wall includes a guide that engages the float to minimize rotation of the float around the longitudinal axis; and the second side wall is elongated axially relative to the longitudinal axis to extend across the window.

Clause 28: The valve assembly as set forth in clause 21 wherein: the seal includes a first end and a second end spaced from the first end; the second body portion includes a post; and the first end of the seal is attached to the post of the second body portion, and the second end of the seal is attached to the float.

Clause 29: The valve assembly as set forth in clause 28 wherein the post extends from the second side wall of the second body portion.

Clause 30: The valve assembly as set forth in clause 29 wherein the cap includes a column that faces the post, and the post is disposed in the column.

Clause 31: The valve assembly as set forth in clause 30 wherein: the cap of the first body portion includes a first wall that faces the cavity; the column extends from the first wall; the second side wall includes a first edge that faces the first wall; and the post extends from the first edge of the second side wall.

Clause 32: The valve assembly as set forth in clause 30 wherein the cap and the column are formed together as one piece, and the second side wall and the post are formed together as one piece.

Clause 33: The valve assembly as set forth in clause 21 wherein the second body portion includes a first end defining an opening, and wherein the seat faces the opening and part of the seal is movable across the opening as the float moves between the initial position and the displaced position.

Clause 34: The valve assembly as set forth in clause 33 wherein the second body portion includes a second end spaced from the first end, and the second side wall extends between the first end and the second end of the second body portion, and the second end of the second body portion includes a base wall to close the cavity.

Clause 35: The valve assembly as set forth in clause 34 wherein the base wall and the first side wall each include a fastening feature that engage each other to attach together the first body portion and the second body portion.

Clause 36: The valve assembly as set forth in clause 35 wherein the fastening feature of the base wall includes a fastener, and the fastening feature of the first side wall defines a hollow, and the fastener is at least partially disposed in the hollow to attach together the first body portion and the second body portion.

Clause 37: The valve assembly as set forth in clause 36 wherein the fastener is further defined as a plurality of fasteners, and the hollow is further defined as a plurality of hollows, and wherein at least one of the plurality of fasteners is disposed in each of the plurality of hollows.

Clause 38: The valve assembly as set forth in clause 35 wherein the fastening feature of the first side wall includes a fastener, and the fastening feature of the base wall defines a hollow, and the fastener is at least partially disposed in the hollow to attach together the first body portion and the second body portion.

Clause 39: The valve assembly as set forth in clause 38 wherein: the base wall includes a flange that extends outwardly across the first side wall to define a slot; the first side wall includes a distal end that is disposed in the slot; and the flange defines the hollow.

Clause 40: The valve assembly as set forth in clause 21 wherein: the first body portion extends to a distal end spaced from the cap, and the distal end of the first body portion defines an access hole; the second body portion is disposed through the access hole; and the second body portion includes a base wall that closes the access hole and closes an end of the gap.

Clause 41: The valve assembly as set forth in clause 40 wherein the window is disposed closer to the cap than to the base wall of the second body portion.

Clause 42: The valve assembly as set forth in clause 40 wherein the housing is characterized by the absence of a third wall disposed in the gap between the first side wall and the second side wall such that the gap is unobstructed between the first side wall and the second side wall.

Clause 43: The valve assembly as set forth in clause 21 wherein: the second side wall includes an outer surface facing outwardly toward the first side wall and an inner surface opposing outer surface and facing inwardly toward the float; the inner surface defines a boundary of the cavity and the float is disposed inside of the inner surface; and the gap is spaced from the inner surface of the second side wall.

Clause 44: The valve assembly as set forth in clause 43 wherein the float is movable axially along a longitudinal axis, and the inner surface of the second side wall includes a guide that engages the float to minimize rotation of the float about the longitudinal axis.

Clause 45: The valve assembly as set forth in clause 21 wherein the second side wall is characterized by the absence of the window.

Clause 46: A valve assembly comprising: a housing including a first body portion and a second body portion attached to the first body portion, with the first body portion and the second body portion cooperating to enclose a cavity; wherein the first body portion includes a cap having a nozzle extending from the cap, and the nozzle defines an outlet; wherein the first body portion includes a seat defining an orifice in fluid communication with the outlet and the cavity; a float disposed inside the cavity and movable between an initial position and a displaced position; a seal secured to the housing and the float, and the seal is spaced from the seat when the float is in the initial position and the seal engages the seat when the float is in the displaced position; and wherein the cap, the nozzle, and the seat are formed together as one piece.

Clause 47: The valve assembly as set forth in clause 46 wherein the seat extends from the cap into the cavity, and the orifice of the seat is disposed between the cavity and the outlet.

Clause 48: The valve assembly as set forth in clause 46 wherein the seal includes a first end secured to the housing and a second end secured to the float.

Clause 49: The valve assembly as set forth in clause 48 wherein: the cap includes a first wall facing the cavity and a second wall opposing the first wall; the first wall includes a column extending into the cavity and spaced from the seat; and the first end of the seal is secured to the column.

Clause 50: The valve assembly as set forth in clause 48 wherein the first body portion includes a column disposed inside the cavity, and the first end of the seal is secured to the column.

Clause 51: The valve assembly as set forth in clause 50 wherein the column and the cap are formed together as one piece.

Clause 52: The valve assembly as set forth in clause 51 wherein the column is further defined as a plurality of columns disposed inside of the cavity, and the columns each define a pocket open to the cavity, and wherein the first end of the seal is secured to a portion of the second body portion and the portion of the second body portion is disposed in the pocket of each of the columns to secure the seal to the housing.

Clause 53: The valve assembly as set forth in clause 51 wherein: the second body portion includes a post; the first end of the seal defines a hole; the column defines a pocket open to the cavity; and the post is disposed through the hole of the first end of the seal and into the pocket to secure the first end of the seal to the housing.

Clause 54: The valve assembly as set forth in clause 53 wherein: the post of the second body portion is further defined as a plurality of posts; the hole of the first end of the seal is further defined as a plurality of holes; the column is further defined as a plurality of columns; the pocket is further defined as a plurality of pockets, with one of the pockets defined in each of the columns that are open to the cavity; and each of the posts is disposed through a respective one of the holes of the first end of the seal and into the pocket of the respective columns to secure the first end of the seal to the housing.

Clause 55: The valve assembly as set forth in clause 48 wherein: the seal includes an engagement portion disposed between the first end and the second end; the engagement portion engages the seat when the float is in the displaced position; the seat includes a sealing face disposed inside the cavity and the sealing face faces the seal; the seat includes an insert disposed inside of the orifice adjacent to the sealing face to prevent the engagement portion of the seal from entering the orifice beyond the insert; and the insert defines at least one opening to allow fluid communication between the cavity and the orifice when the float is in the initial position.

Clause 56: The valve assembly as set forth in clause 55 wherein the insert and the seat are formed as one piece.

Clause 57: The valve assembly as set forth in clause 46 wherein: the outlet of the nozzle includes an inner diameter; the orifice of the seat includes an inner diameter; and the inner diameter of the outlet is greater than the inner diameter of the orifice.

Clause 58: The valve assembly as set forth in clause 46 wherein: the seat includes an inner wall that surrounds the orifice; the nozzle includes an inner wall that surrounds the outlet; the inner wall of the seat defines an elliptical configuration to present a first inner diameter of the orifice and a second inner diameter of the orifice; the first inner diameter is less than the second inner diameter; and the inner wall of the nozzle defines a circular configuration which presents an inner diameter greater than the first inner diameter of the inner wall of the seat.

Clause 59: A method of forming a valve assembly, the method comprising: attaching together a first core and a second core to form a sub-core; positioning the sub-core inside a mold; forming a first body portion of a housing inside the mold to present a cap, a nozzle formed around the first core, and a seat formed around the second core; removing the first core from the first body portion to present an outlet of the nozzle; removing the second core from the first body portion to present an orifice of the seat; and wherein the cap, the nozzle, and the seat are formed as one piece when forming the first body portion.

Clause 60: A valve assembly comprising: a housing including a first body portion and a second body portion attached to the first body portion, with the first body portion and the second body portion cooperating to enclose a cavity; wherein the first body portion includes a cap having a nozzle extending from the cap, and the nozzle defines an outlet; wherein the first body portion includes a first side wall extending outwardly from the cap away from the nozzle, and the first side wall has an exterior surface that defines an outside of the housing and has an interior surface opposing the exterior surface; wherein the first side wall defines a window through the exterior surface and the interior surface; wherein the first body portion includes a seat defining an orifice in fluid communication with the outlet and the cavity; a float disposed inside the cavity and movable between an initial position and a displaced position; a seal secured to the housing and the float, and the seal is spaced from the seat when the float is in the initial position to allow fluid communication through the orifice and out of the outlet, and the seal engages the seat when the float is in the displaced position to prevent fluid communication through the orifice and out of the outlet; wherein the second body portion includes a second side wall that surrounds the float, and the second side wall extends toward the cap such that the first side wall and the second side wall overlap, and the second side wall extends across the window to obstruct direct fluid communication between the window and the float; and wherein the second side wall is spaced from the first side wall to define a gap that is unobstructed between the first side wall and the second side wall, and the gap is in direct fluid communication with the window relative to the interior surface of the housing.

Clause 61: The valve assembly as set forth in clause 60 wherein: the cap closes a first distal end of the cavity and the second body portion includes a base wall that closes a second distal end of the cavity; the float is disposed between the cap and the base wall; the second side wall is elongated axially relative to a longitudinal axis to extend across the window; and the second side wall and the base wall are formed together as one piece.

Clause 62: The valve assembly as set forth in clause 61 wherein: the cap and the first side wall are formed together as one piece; the first body portion and the second body portion are separate pieces attached to each other; and the first body portion and the second body portion each include a fastening feature cooperating with each other to attach together the first body portion and the second body portion.

Clause 63: The valve assembly as set forth in clause 60 wherein: the first body portion extends to a distal end spaced from the cap, and the distal end of the first body portion defines an access hole; the second body portion is disposed through the access hole; the second body portion includes a base wall that closes the access hole and closes an end of the gap; and the housing is characterized by the absence of a third wall disposed in the gap between the first side wall and the second side wall such that the gap is unobstructed between the first side wall and the second side wall.

Clause 64: The valve assembly as set forth in clause 60 wherein: the second side wall includes an outer surface facing outwardly toward the first side wall and an inner surface opposing outer surface and facing inwardly toward the float; the inner surface defines a boundary of the cavity and the float is disposed inside of the inner surface; and the gap is spaced from the inner surface of the second side wall.

Clause 65: The valve assembly as set forth in clause 60 wherein the second side wall is characterized by the absence of the window.

Clause 66: A valve assembly comprising: a housing including a first body portion and a second body portion attached to the first body portion, with the first body portion and the second body portion cooperating to enclose a cavity; wherein the first body portion includes a cap having a nozzle extending from the cap, and the nozzle defines an outlet; wherein the first body portion includes a seat defining an orifice in fluid communication with the outlet and the cavity; a float disposed inside the cavity and movable between an initial position and a displaced position; a seal secured to the housing and the float, and the seal is spaced from the seat when the float is in the initial position and the seal engages the seat when the float is in the displaced position; and wherein the cap, the nozzle, and the seat are formed together as one piece.

Clause 67: The valve assembly as set forth in clause 66 wherein the seat extends from the cap into the cavity.

Clause 68: The valve assembly as set forth in clauses 66 or 67 wherein the orifice of the seat is disposed between the cavity and the outlet.

Clause 69: The valve assembly as set forth in clauses 66, 67, or 68 wherein: the seat includes a sealing face disposed inside the cavity and the sealing face faces the seal; and the seal engages the sealing face when the float is in the displaced position.

Clause 70: The valve assembly as set forth in one of clauses 66-69 wherein: the cap includes a first wall facing the cavity and a second wall opposing the first wall; and the seat extends from the first wall into the cavity.

Clause 71: The valve assembly as set forth in one of clauses 66-70 wherein the seal includes a first end secured to the housing and a second end secured to the float.

Clause 72: The valve assembly as set forth in clause 71 wherein: the cap includes a first wall facing the cavity and a second wall opposing the first wall; the first wall includes a column extending into the cavity and spaced from the seat; and the first end of the seal is secured to the column.

Clause 73: The valve assembly as set forth in clause 71 wherein the first body portion includes a column disposed inside the cavity, and the first end of the seal is secured to the column.

Clause 74: The valve assembly as set forth in clause 73 wherein the column and the cap are formed together as one piece.

Clause 75: The valve assembly as set forth in one of clauses 73 or 74 wherein the column is further defined as a plurality of columns disposed inside of the cavity.

Clause 76: The valve assembly as set forth in clause 75 wherein the columns each define a pocket open to the cavity, and the first end of the seal is secured to a portion of the second body portion and the portion of the second body portion is disposed in the pocket of each of the columns to secure the seal to the housing.

Clause 77: The valve assembly as set forth in one of clauses 73-76 wherein: the second body portion includes a post; the first end of the seal defines a hole; the column defines a pocket open to the cavity; and the post is disposed through the hole of the first end of the seal and into the pocket to secure the first end of the seal to the housing.

Clause 78: The valve assembly as set forth in clause 77 wherein: the post of the second body portion is further defined as a plurality of posts; the hole of the first end of the seal is further defined as a plurality of holes; the column is further defined as a plurality of columns; the pocket is further defined as a plurality of pockets, with one of the pockets defined in each of the columns that are open to the cavity; and each of the posts is disposed through a respective one of the holes of the first end of the seal and into the pocket of the respective columns to secure the first end of the seal to the housing.

Clause 79: The valve assembly as set forth in one of clauses 71-78 wherein the seal includes an engagement portion disposed between the first end and the second end, and wherein the engagement portion engages the seat when the float is in the displaced position.

Clause 80: The valve assembly as set forth in clause 79 wherein: the seat includes a sealing face disposed inside the cavity and the sealing face faces the seal; the seat includes an insert disposed inside of the orifice adjacent to the sealing face to prevent the engagement portion of the seal from entering the orifice beyond the insert; and the insert defines at least one opening to allow fluid communication between the cavity and the orifice when the float is in the initial position.

Clause 81: The valve assembly as set forth in clause 80 wherein the insert and the seat are formed as one piece.

Clause 82: The valve assembly as set forth in one of clauses 66-81 wherein: the outlet of the nozzle includes an inner diameter; the orifice of the seat includes an inner diameter; and the inner diameter of the outlet is greater than the inner diameter of the orifice.

Clause 83: The valve assembly as set forth in one of clauses 66-81 wherein: the seat includes an inner wall that surrounds the orifice; the nozzle includes an inner wall that surrounds the outlet; the inner wall of the seat defines an elliptical configuration to present a first inner diameter of the orifice and a second inner diameter of the orifice; the first inner diameter is less than the second inner diameter; and the inner wall of the nozzle defines a circular configuration which presents an inner diameter greater than the first inner diameter of the inner wall of the seat.

Clause 84: A valve assembly comprising: a housing including a first body portion and a second body portion attached to the first body portion, with the first body portion and the second body portion cooperating to enclose a cavity; wherein the first body portion includes a cap having a nozzle extending from the cap, and the nozzle defines an outlet; wherein the first body portion includes a first side wall extending outwardly from the cap away from the nozzle, and the first side wall has an exterior surface that defines an outside of the housing and has an interior surface opposing the exterior surface; wherein the first side wall defines a window through the exterior surface and the interior surface; wherein the first body portion includes a seat defining an orifice in fluid communication with the outlet and the cavity; a float disposed inside the cavity and movable between an initial position and a displaced position; a seal secured to the housing and the float, and the seal is spaced from the seat when the float is in the initial position to allow fluid communication through the orifice and out of the outlet, and the seal engages the seat when the float is in the displaced position to prevent fluid communication through the orifice and out of the outlet; wherein the second body portion includes a second side wall that surrounds the float, and the second side wall extends toward the cap such that the first side wall and the second side wall overlap, and the second side wall extends across the window to obstruct direct fluid communication between the window and the float; and wherein the second side wall is spaced from the first side wall to define a gap that is unobstructed between the first side wall and the second side wall, and the gap is in direct fluid communication with the window relative to the interior surface of the housing.

Clause 85: The valve assembly as set forth in clause 84 wherein the cap closes a first distal end of the cavity and the second body portion includes a base wall that closes a second distal end of the cavity, and wherein the float is disposed between the cap and the base wall.

Clause 86: The valve assembly as set forth in clause 85 wherein the second side wall and the base wall are formed together as one piece.

Clause 87: The valve assembly as set forth in one of clauses 84-86 wherein the cap and the first side wall are formed together as one piece.

Clause 88: The valve assembly as set forth in one of clauses 84-87 wherein the first body portion and the second body portion are separate pieces attached to each other.

Clause 89: The valve assembly as set forth in one of clauses 84-88 wherein the first body portion and the second body portion each include a fastening feature cooperating with each other to attach together the first body portion and the second body portion.

Clause 90: The valve assembly as set forth in one of clauses 84-89 wherein: the float is movable axially along a longitudinal axis; the second side wall includes a guide that engages the float to minimize rotation of the float around the longitudinal axis; and the second side wall is elongated axially relative to the longitudinal axis to extend across the window.

Clause 91: The valve assembly as set forth in one of clauses 84-90 wherein: the seal includes a first end and a second end spaced from the first end; the second body portion includes a post; and the first end of the seal is attached to the post of the second body portion, and the second end of the seal is attached to the float.

Clause 92: The valve assembly as set forth in clause 91 wherein the post extends from the second side wall of the second body portion.

Clause 93: The valve assembly as set forth in clause 92 wherein the cap includes a column that faces the post, and the post is disposed in the column.

Clause 94: The valve assembly as set forth in clause 93 wherein: the cap of the first body portion includes a first wall that faces the cavity; the column extends from the first wall; the second side wall includes a first edge that faces the first wall; and the post extends from the first edge of the second side wall.

Clause 95: The valve assembly as set forth in one of clauses 93 or 94 wherein the cap and the column are formed together as one piece, and the second side wall and the post are formed together as one piece.

Clause 96: The valve assembly as set forth in one of clauses 84-95 wherein the second body portion includes a first end defining an opening, and wherein the seat faces the opening and part of the seal is movable across the opening as the float moves between the initial position and the displaced position.

Clause 97: The valve assembly as set forth in clause 96 wherein the second body portion includes a second end spaced from the first end, and the second side wall extends between the first end and the second end of the second body portion, and the second end of the second body portion includes a base wall to close the cavity.

Clause 98: The valve assembly as set forth in clause 97 wherein the base wall and the first side wall each include a fastening feature that engage each other to attach together the first body portion and the second body portion.

Clause 99: The valve assembly as set forth in clause 98 wherein the fastening feature of the base wall includes a fastener, and the fastening feature of the first side wall defines a hollow, and the fastener is at least partially disposed in the hollow to attach together the first body portion and the second body portion.

Clause 100: The valve assembly as set forth in clause 99 wherein the fastener is further defined as a plurality of fasteners, and the hollow is further defined as a plurality of hollows, and wherein at least one of the plurality of fasteners is disposed in each of the plurality of hollows.

Clause 101: The valve assembly as set forth in clause 98 wherein the fastening feature of the first side wall includes a fastener, and the fastening feature of the base wall defines a hollow, and the fastener is at least partially disposed in the hollow to attach together the first body portion and the second body portion.

Clause 102: The valve assembly as set forth in clause 101 wherein: the base wall includes a flange that extends outwardly across the first side wall to define a slot; the first side wall includes a distal end that is disposed in the slot; and the flange defines the hollow.

Clause 103: The valve assembly as set forth in one of clauses 84-102 wherein: the first body portion extends to a distal end spaced from the cap, and the distal end of the first body portion defines an access hole; the second body portion is disposed through the access hole; and the second body portion includes a base wall that closes the access hole and closes an end of the gap.

Clause 104: The valve assembly as set forth in one of clauses 84-103 wherein the window is disposed closer to the cap than to the base wall of the second body portion.

Clause 105: The valve assembly as set forth in one of clauses 84-104 wherein the housing is characterized by the absence of a third wall disposed in the gap between the first side wall and the second side wall such that the gap is unobstructed between the first side wall and the second side wall.

Clause 106: The valve assembly as set forth in one of clauses 84-105 wherein: the second side wall includes an outer surface facing outwardly toward the first side wall and an inner surface opposing outer surface and facing inwardly toward the float; the inner surface defines a boundary of the cavity and the float is disposed inside of the inner surface; and the gap is spaced from the inner surface of the second side wall.

Clause 107: The valve assembly as set forth in one of clauses 84-106 wherein the float is movable axially along a longitudinal axis, and the inner surface of the second side wall includes a guide that engages the float to minimize rotation of the float about the longitudinal axis.

Clause 108: The valve assembly as set forth in one of clauses 84-107 wherein the second side wall is characterized by the absence of the window.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A valve assembly comprising:
a housing including a first body portion and a second body portion attached to the first body portion, with the first body portion and the second body portion cooperating to enclose a cavity,
wherein the first body portion includes a cap having a nozzle extending from the cap, and the nozzle defines an outlet, wherein the first body portion includes a seat defining an orifice in fluid communication with the outlet and the cavity, wherein the first body portion includes a column disposed inside the cavity so that the column defines a pocket open to the cavity, and wherein the second body portion includes a post;
a float disposed inside the cavity and movable between an initial position and a displaced position; and
a seal configured so that the seal is spaced from the seat when the float is in the initial position and the seal engages the seat when the float is in the displaced position, wherein the seal includes a first end defining a hole and a second end secured to the float, and
wherein the post of the second body portion is disposed through the hole of the first end of the seal and into the pocket to secure the first end of the seal to the housing.

2. The valve assembly as set forth in claim 1 wherein the seat extends from the cap into the cavity, and the orifice of the seat is disposed between the cavity and the outlet.

3. The valve assembly as set forth in claim 1 wherein the seal includes the first end secured to the housing and the second end secured to the float.

4. The valve assembly as set forth in claim 3 wherein:
the cap includes a first wall facing the cavity and a second wall opposing the first wall;
the first wall includes the column extending into the cavity and spaced from the seat; and
the first end of the seal is secured to the column.

5. The valve assembly as set forth in claim 3 wherein the first body portion includes the column disposed inside the cavity, and the first end of the seal is secured to the column.

6. The valve assembly as set forth in claim 5 wherein the column and the cap are formed together as one piece.

7. The valve assembly as set forth in claim 6 wherein the column is further defined as a plurality of columns disposed inside of the cavity, and the columns each define a pocket open to the cavity, and wherein the first end of the seal is secured to a portion of the second body portion and the portion of the second body portion is disposed in the pocket of each of the columns to secure the seal to the housing.

8. The valve assembly as set forth in claim 3 wherein:
the seal includes an engagement portion disposed between the first end and the second end;
the engagement portion engages the seat when the float is in the displaced position;
the seat includes a sealing face disposed inside the cavity and the sealing face faces the seal;
the seat includes an insert disposed inside of the orifice adjacent to the sealing face to prevent the engagement portion of the seal from entering the orifice beyond the insert; and
the insert defines at least one opening to allow fluid communication between the cavity and the orifice when the float is in the initial position.

9. The valve assembly as set forth in claim 8 wherein the insert and the seat are formed as one piece.

10. The valve assembly as set forth in claim 1 wherein:
the post of the second body portion is further defined as a plurality of posts;
the hole of the first end of the seal is further defined as a plurality of holes;
the column is further defined as a plurality of columns;
the pocket is further defined as a plurality of pockets, with one of the pockets defined in each of the columns that are open to the cavity; and
each of the posts is disposed through a respective one of the holes of the first end of the seal and into the pocket of the respective columns to secure the first end of the seal to the housing.

11. The valve assembly as set forth in claim 1 wherein:
the outlet of the nozzle includes an inner diameter;
the orifice of the seat includes an inner diameter; and
the inner diameter of the outlet is greater than the inner diameter of the orifice.

12. The valve assembly as set forth in claim 1 wherein:
the seat includes an inner wall that surrounds the orifice;
the nozzle includes an inner wall that surrounds the outlet;
the inner wall of the seat defines an elliptical configuration to present a first inner diameter of the orifice and a second inner diameter of the orifice;
the first inner diameter is less than the second inner diameter; and
the inner wall of the nozzle defines a circular configuration which presents an inner diameter greater than the first inner diameter of the inner wall of the seat.

13. A valve assembly comprising:
a housing including a first body portion and a second body portion attached to the first body portion, with the first body portion and the second body portion cooperating to enclose a cavity,
wherein the first body portion includes a cap having a nozzle extending from the cap, and the nozzle defines an outlet, wherein the nozzle includes an inner wall that surrounds the outlet, wherein the first body portion includes a seat defining an orifice in fluid communication with the outlet and the cavity;
a float disposed inside the cavity and movable between an initial position and a displaced position; and
a seal secured to the housing and the seal is spaced from the seat when the float is in the initial position and the seal engages the seat when the float is in the displaced position,
wherein the seat includes an inner wall that surrounds the orifice and defines an elliptical configuration to present a first inner diameter of the orifice and a second inner diameter of the orifice, wherein the first inner diameter is less than the second inner diameter, and
wherein the inner wall of the nozzle defines a circular configuration which presents an inner diameter greater than the first inner diameter of the inner wall of the seat.

14. A valve assembly comprising:
a housing including a first body portion and a second body portion attached to the first body portion, with the first body portion and the second body portion cooperating to enclose a cavity;
wherein the first body portion includes a cap having a nozzle extending from the cap, and the nozzle defines an outlet, wherein the nozzle includes an inner wall that surrounds the outlet, wherein the first body portion includes a seat defining an orifice in fluid communication with the outlet and the cavity, wherein the seat includes an inner wall that surrounds the orifice;
a float disposed inside the cavity and movable between an initial position and a displaced position; and
a seal secured to the housing and the float, wherein the seal is spaced from the seat when the float is in the initial position and wherein an engagement portion of the seal engages the seat when the float is in the displaced position, and
wherein the seat further includes an insert disposed inside of the orifice to prevent the engagement portion of the seal from entering the orifice beyond the insert, wherein the insert extends from the inner wall of the seat to partially block the orifice.

* * * * *